United States Patent
Hung et al.

(10) Patent No.: US 12,555,188 B2
(45) Date of Patent: Feb. 17, 2026

(54) RGB-IR DATA PROCESSING FOR AUTONOMOUS SYSTEMS AND APPLICATIONS

(71) Applicant: NVIDIA Corporation, Santa Clara, CA (US)

(72) Inventors: Samuel Hung, Santa Clara, CA (US); Sean Midthun Pieper, Waldport, OR (US); Eric Dujardin, San Jose, CA (US); Sung Hyun Hwang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 751 days.

(21) Appl. No.: 17/736,648

(22) Filed: May 4, 2022

(65) Prior Publication Data
US 2023/0360178 A1  Nov. 9, 2023

(51) Int. Cl.
*G06T 5/00* (2024.01)

(52) U.S. Cl.
CPC ...... *G06T 5/00* (2013.01); *G06T 2207/10024* (2013.01); *G06T 2207/10048* (2013.01); *G06T 2207/20081* (2013.01)

(58) Field of Classification Search
CPC ............. G06T 5/00; G06T 2207/10024; G06T 2207/10048; G06T 2207/20081; G06V 10/22; G06V 10/803; G06V 20/588; H04N 9/77
See application file for complete search history.

(56) References Cited

U.S. PATENT DOCUMENTS

| | | | |
|---|---|---|---|
| 2010/0103268 A1* | 4/2010 | Tokuyama | H04N 5/33 348/E5.085 |
| 2014/0139643 A1* | 5/2014 | Hogasten | H10F 39/8057 348/48 |

(Continued)

OTHER PUBLICATIONS

Skorka et al., "Color Correction for RGB Sensors with Dual-Band Filters for In-Cabin Imaging Applications," IS&T International Symposium on Electronic Imaging, Autonomous Vehicles and Machines Conference, 2019, 8 pages.

(Continued)

*Primary Examiner* — Molly Wilburn
(74) *Attorney, Agent, or Firm* — Lowenstein Sandler LLP

(57) ABSTRACT

A system, such as for use in an automobile, is configured to process image data that includes infrared values and visible light values (e.g., data generated by a red, green, blue, infrared (RGB-IR) sensor). The system determines how to blend IR data and visible light data together to generate optimal images according to current light levels. In embodiments, the system computes a scene detection value for the image data based on a comparison between the infrared values and the visible light values. The system can then determine an amount of infrared correction, a color correction factor, a color saturation factor, etc. to apply to the image data. The system then transforms the image data based on the amount of infrared correction, the color correction factor, the color saturation factor, etc. The transformed image data includes more information for low light scenes than is traditionally available, and thus produces higher quality images in embodiments.

21 Claims, 17 Drawing Sheets

(56) References Cited

U.S. PATENT DOCUMENTS

| | | | |
|---|---|---|---|
| 2014/0270519 A1* | 9/2014 | Choe | H04N 5/213 |
| | | | 382/167 |
| 2017/0061663 A1* | 3/2017 | Johnson | H04N 23/11 |
| 2018/0197275 A1* | 7/2018 | Price | H04N 23/11 |
| 2018/0332209 A1* | 11/2018 | Kojima | H04N 23/11 |
| 2020/0112662 A1* | 4/2020 | Sakamoto | G06T 7/74 |

OTHER PUBLICATIONS

Teranaka et al., Single-Sensor RGB and NIR Image Acquisition: Toward Optimal Performance by Taking Account of CFA Pattern, Demosaicking, and Color Correction, IS&T International Symposium on Electronic Imaging, Digital Photography and Mobile Imaging XII, 2016, 6 pages.

* cited by examiner

| SCENE DETECTION VALUE 305 | IR SUBTRACTION FACTOR 310 | WHITE BALANCE CORRECTION FACTOR 315 | COLOR CORRECTION FACTOR 320 | COLOR SATURATION FACTOR 325 |
|---|---|---|---|---|
| 0 | 1 | 1 | 1 | 1 |
| 0.1 | 1 | 1 | 1 | 1 |
| 0.2 | 1 | 1 | 1 | 1 |
| 0.3 | 1 | 1 | 1 | 1 |
| 0.4 | 1 | 1 | 0.98 | 0.98 |
| 0.5 | 0.8 | 0.98 | 0.86 | 0.86 |
| 0.6 | 0.6 | 0.8 | 0.6 | 0.6 |
| 0.7 | 0.4 | 0.5 | 0.3 | 0.3 |
| 0.8 | 0.2 | 0.2 | 0.1 | 0.1 |
| 0.9 | 0 | 0.05 | 0.01 | 0.01 |
| 1 | 0 | 0 | 0 | 0 |

RGB-IR DATA PROCESSING FOR AUTONOMOUS SYSTEMS AND APPLICATIONS

TECHNICAL FIELD

Embodiments of the disclosure relate generally to image processing, and more specifically, relate to dynamic control of image generation based on infrared (IR) data and visible light data (e.g., red, green and blue (RGB) data) from RGB-IR sensors.

BACKGROUND

RGB-IR sensors are used in imaging systems, such as those used for driver and occupant monitoring systems (e.g., in automobiles). For RGB-IR sensors, color signals become less useful as an amount of visible light in a scene diminishes. Systems that use RGB-IR sensors generally have a visible light threshold above which data from RGB sensors are used and below which data from IR sensors are used. RGB-IR systems typically have ¼ the number of IR sensor pixels as RGB sensor pixels. Accordingly, the signal from IR sensor pixels has ¼ the resolution of the signal from RGB sensor pixels. Such reduced resolution from IR sensor pixels reduces a quality and usefulness of images generated in low light settings (e.g., at night).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
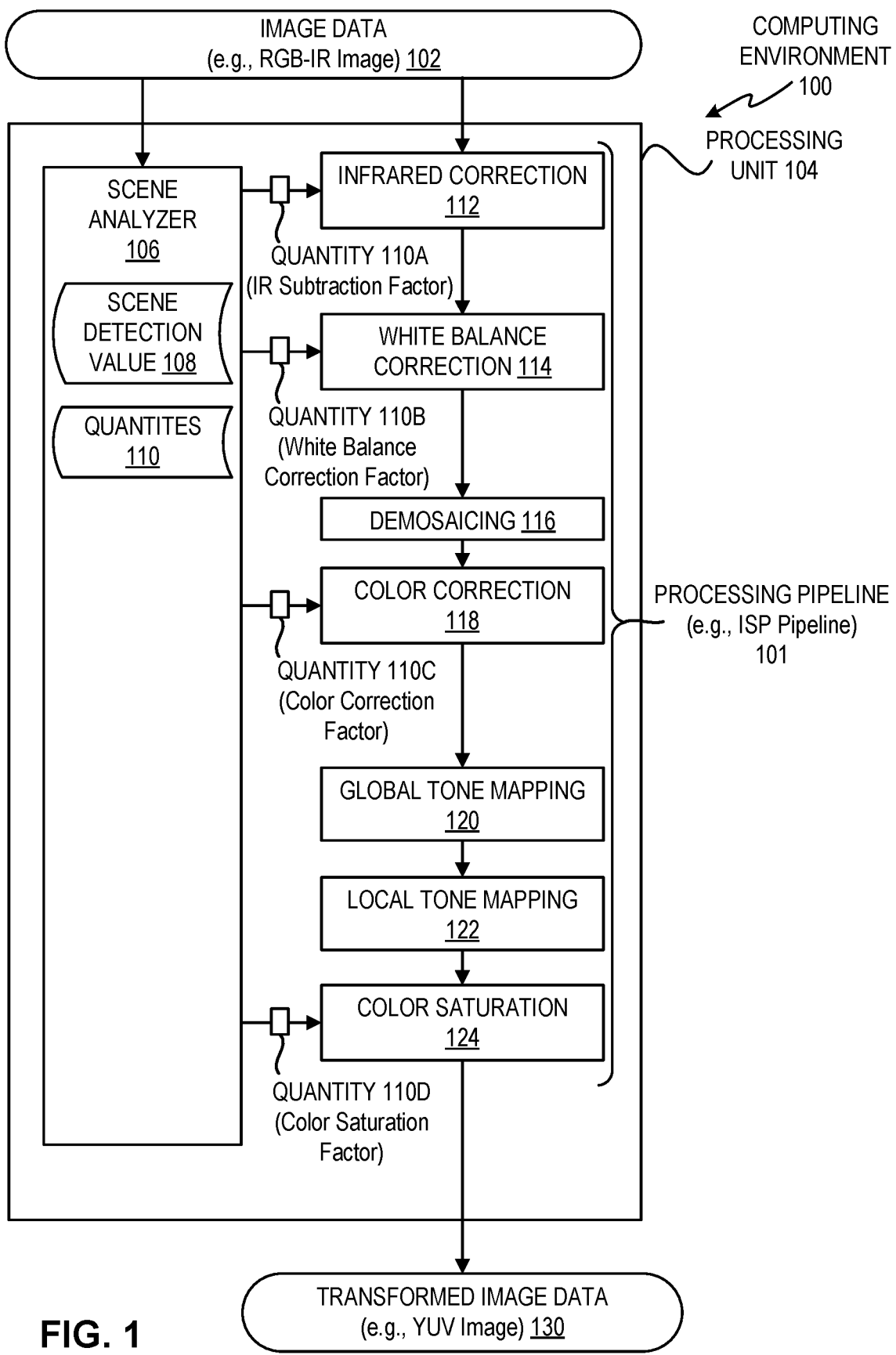
FIG. 1 illustrates an example computing environment that includes technology to dynamically adjust image data that includes infrared values and visible light values, in accordance with some embodiments of the present disclosure.

Occupant monitoring systems typically use monochrome infrared (IR) cameras and more recently have begun using color IR cameras (i.e., red, green, blue, infrared (RGB-IR) cameras). The use of IR enables the cameras to function at night by using IR illumination to brighten up the target area (e.g., driver in cabin). The image sensors of the RGB-IR cameras are typically configured to have the majority of the pixel sensors detect visible light and a smaller portion to detect the IR (e.g., ¼ of pixel sensors detect IR). When a scene gets darker (e.g., at night), the pixel sensors for visible light are less effective and traditional systems switch to using just the IR pixel sensors. This switch from color to monochromatic IR can be abrupt and cause the quality and resolution of the image to substantially decrease (e.g., reduce to ¼ resolution). The abrupt switch and change in resolution may be particularly problematic for computer vision applications that are trained using a particular image quality and resolution, which may not handle the change between brighter and darker scenes well.

Embodiments of the present disclosure include technology for an Image Signal Processing (ISP) pipeline that better handles the transition between bright and dark scenes. The technology is able to use information from the visible light pixel sensors to keep the image resolution higher for dark scenes than has traditionally been achievable, and is better at transitioning between the bright and dark scenes than prior solutions. For example, the IR signal measured by non-IR pixels may be used under certain lighting conditions, and the amount of the IR signal to use may vary based on the lighting conditions. The technology is able to gracefully adapt image capture and rendering of a combined near-IR and visible light signal in response to changes in the mix of ambient light and emitted near-IR light.

The technology analyzes an image from the RGB-IR camera and determines a scene detection value (e.g., which may indicate a brightness of the scene). In one example, the scene detection value may be based on a ratio of the average intensity of IR (e.g., as emitted by an IR emitter associated with the RGB-IR camera) to the average intensity of visible light. Typically, the ratio or IR intensity to visible light intensity will be lower during the day because the intensity of the IR illumination is lower than the intensity of visible light (e.g., ratio of 1:100). Conversely, the ratio will generally be much higher at night because the intensity of the IR illumination is closer to the intensity of visible light (e.g., ratio 1:1). Pixels configured to detect visible light also generally detect IR. Accordingly, since there is generally little to no background environmental light (e.g., from the sun) at night or other low light settings (e.g., in a tunnel), the IR pixels and visible light pixels (e.g., G pixels) may detect the same IR that is output by RGB-IR camera system, resulting in a ratio of about 1:1 for IR to visible light.

An RGB-IR camera may include an RGB-IR color filter array (CFA). The RGB-IR CFA is a variation of the standard Bayer CFA that substitutes some of the positions in the color filter array that would normally pass red, green, or blue light with an IR filter that passes IR wavelengths (e.g., near-IR wavelengths) and blocks visible light. For example, this can be done by taking a 4×4 area of a Bayer sensor and replacing two of the red and two of the blue filters with IR filters, creating a repeating pattern across the sensor. In a typical design, the camera will have an IR cut filter with a narrow band-pass matching the emission spike of an IR emitter (e.g., at 940 nm) of the RGB-IR camera.

The R, G and B color filters are generally transparent to IR emission. As a result, IR light leaks equally into all channels of the sensor. Conventionally, to achieve a high quality image for human visualization and/or use with machine learning systems that operate on images systems, the IR signal measured on the IR pixels is subtracted out from the R, G and B pixels. As the visible light in a scene is reduced compared to the IR light (e.g., from an IR emitter), a resulting color signal may diminish, become noisier, and eventually turn black. The signal from the IR-only pixels is generally separated in the image signal processor to provide a ¼ resolution image that can be used for machine vision and/or display to a user. This image will be available in both bright and dark conditions, but the lower resolution reduces the potential machine vision performance compared to a monochrome IR sensor (e.g., in which all pixels are IR sensor pixels).

Systems (e.g., occupant monitoring systems (OMS) and/or driver monitoring systems (DMS) of automobiles) that use RGB-IR cameras face a problem that color signals become less useful when the amount of visible light in a scene diminishes. Accordingly, conventional systems that use RGB-IR cameras apply a visible light threshold, and when an amount of available visible light falls below the threshold, such systems transition to use of the IR pixel sensors of the RGB-IR cameras. However, the signal from the IR-only pixels in a typical RGB-IR sensor amounts to a ¼ resolution image, resulting in a lower quality image—and by extension reducing a usefulness of the monochrome IR information. In contrast to conventional systems that use RGB-IR cameras, systems described in embodiments herein that use RGB-IR cameras may maintain full resolution regardless of lighting conditions. Maintaining full resolution rather than alternating between full and quarter resolution increases the amount of data being processed in the resulting images, increases the quality of the images, and improves the efficiency of training these systems, saving time and increasing the potential efficiency of the systems.

Conventionally, all of the intensity for visible light pixels that is attributable to IR is filtered out. However, in embodiments, processing logic dynamically determines how much of the intensity for visible light pixels to filter out based on a determined scene detection value. By using the visible light pixels to detect IR signal, a number of pixels that are used in low light conditions is increased, and thus a resolution of images generated in low light conditions is also increased. As a scene becomes darker, more and more of the signal for the visible light pixels that is attributable to IR is used. This can cause incorrect white balance, incorrect colors, incorrect color saturation, and so on if static white balance correction, color correction, color saturation, etc. values are used that are predetermined for the RGB-IR camera. Accordingly, in addition to using the scene detection value to determine an amount of infrared correction (e.g., how much IR signal to subtract from measurements for visible light pixels), the scene detection value and/or amount of infrared correction may be used to dynamically determine a white balance correction factor, a color correction factor, a color saturation factor, and so on. Each of these factors will shift depending on how much IR signal is filtered out from the visible light pixel values.

Accordingly, once the scene detection value is determined, it may then be used as input to determine the quantities used by different portions or components of the image processing pipeline. For example, the scene detection value may be used to tune the amount of infrared correction, white balance correction, color correction, and saturation. As the scene transitions from bright to dark the ratio will increase (e.g., from 1:100 to 1:1) and there will be a smooth decrease in the percentage of IR subtraction and a smooth increase in the desaturation. The ratio or IR intensity to visible light intensity can be input to a function or used as an index value for a lookup table, and each particular scene detection value (e.g., ratio) can correspond to a particular IR subtraction value, a particular desaturation percentage, etc.

Conventional systems that use RGB-IR cameras use either a signal from RGB pixels or signal from IR cameras at any given time. Such systems switch from using the signal from the RGB pixels when a scene is light (e.g., during daytime) to using the signal from the IR pixels when a scene is dark (e.g., during nighttime) according to some threshold. This switch from using the signal from the RGB pixels to using the signal from the IR pixels is an abrupt switch between a higher resolution color image to a lower resolution monochrome IR image. For example, there may be some pre-determined and static threshold where prior art systems switch from outputting an RGB image to outputting a monochrome IR image. Embodiments avoid such an abrupt switch by using the scene detection value as input to smoothly transition from an output image that is based more on the RGB information in brighter scenes (where visible light dominates) to an output image that is based more on the IR information in darker scenes (IR illumination dominates). For any given scene detection value, some portion of the signal for RGB pixel sensors that is attributable to IR may be used rather than completely removing the portion of the signal attributable to IR. In embodiments, the technology continues to use the RGB information in darker conditions to keep the resolution consistent and does not throw out the RGB information and use just the IR pixel sensors as the scene darkens, which would result in the output image having ¼ of the information/resolution. Accordingly, in embodiments monochrome IR images that are generated in low light situations may have a same resolution as color images that are generated in bright light situations. In embodiments, systems that use a standard RGB-IR camera are able to provide full-resolution images with high availability for both machine vision and human vision tasks, where image quality may be minimally and gracefully degraded in response to reductions in ambient visible light.

Various aspects of the above referenced technology are described in details herein below by way of examples, rather than by way of limitation. The examples provided below discuss the technology incorporated into the pipeline of one or more image signal processors and may be applied after the image is received from an image sensor and before it is persistently stored. In other examples, the technology may be used to update the image after the image data is persistently stored.

Some embodiments are discussed with reference to cameras in a cabin of a car. However, it should be understood that embodiments also cover use of images generated by RGB-IR cameras in other applications, such as in a cabin of other types of automobiles (e.g., a cockpit of an airplane, a cabin of a truck, a cabin of a train, etc.), in a security camera, in an externally facing camera of an automobile (e.g., that images a surrounding area external to the automobile), and so on. Accordingly, the examples discussed herein with regards to adjusting images used for in-cabin camera systems are merely examples, and the same techniques described with reference to these examples also apply in any other setting where RGB-IR cameras are used.

Some embodiments are discussed with reference to IR and IR sensors. It should be understood that as used herein the term infrared (IR) may include both traditional IR radiation (e.g., radiation having a wavelength of between 780 nm and 1 mm) as well as near-IR radiation (e.g., radiation having a wavelength of between 750 nm and 1300 nm).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 illustrates an example computing environment 100 that includes technology to perform dynamic transformation of one or more images based on computed scene detection values, in accordance with some embodiments of the present disclosure. Computing environment 100A may include one or more processing unit 104 (e.g., an image signal processor (ISP) and/or other processors for an ISP pipeline 101) that operates on incoming image data 102 (e.g., RGB-IR images) to generate transformed image data 130 (e.g., transformed color or monochromatic images).

Processing unit 104 may be configured to receive image data 102 and perform one or more operations on the image data to generate an image that can be used in downstream processes (e.g., by image analysis algorithms, machine learning models, output to displays, etc.), as discussed below. Processing unit 104 may be or include one or more devices that are capable of processing data of one or more images. Processing unit 104 may be referred to as an image processor and may be or include one or more Image Signal Processors (ISPs), Digital Signal Processors (DSPs), Graphical Processing Units (GPUs), Central Processing Units (CPUs), Data Processing Units (DPUs), Field Programmable Gate Arrays (FPGAs), Application Specific Integrated Circuits (ASICs), other integrated circuit, or a combination thereof.

Processing unit 104 may receive image data 102 (e.g., one or more images) from another device (e.g., an RGB-IR camera) as analog signals, digital signals, or a combination thereof. The images may be a sequence of images and each image in the sequence may be a video frame. Processing unit 104 may receive the image data as encoded images, raw images, or a combination thereof.

Image data 102 may correspond to a set of values from visible light sensor pixels and IR sensor pixels, and the set may have a size (e.g., set size) and each value may have a size (e.g., pixel size). The set size may be referred to as resolution and may be measured in a quantity of pixels and may be 720×480 (e.g., Standard-Definition (SD)), 1920×1800 (High Definition (HD)), 3840×2160 (Ultra High Definition (4K UHD)), 7680×4320 (8K UHD), or other size or ratio. The value size may be referred to as the pixel size and may have a range (e.g., pixel value range) that is based on the number of bits. For example, the value size may be 8 bits (e.g., range 0-255), 10 bits (e.g., range 0-1023), 12 bits (e.g., range 0-4K), other number of bits, or a combination thereof. The value size (e.g., pixel size) may be related to the dynamic range of the respective image.

Image data 102 may include intensity values from many sensor pixels of an RGB-IR camera, including intensity values from red (R) sensor pixels, green (G) sensor pixels, blue (B) sensor pixels and infrared (IR) sensor pixels. Image data 102 may include color information (e.g., from R, G, B sensor pixels) and/or monochromatic information (e.g., from IR sensor pixels), and may correspond to a still image (e.g., photograph), an image in a sequence of images (e.g., frames of a video), or a combination thereof. In embodiments, the image data 102 includes a histogram for an image. A hardware component (not shown) may generate a histogram of the red, green, blue and IR channels for a generated image. Entries in the histogram may have discretized values (e.g., discretized into 256 different values in one embodiment). In one embodiment, there are more possible values (e.g., higher resolution for the histogram) for lower signals than for higher signals.

Image data 102 may be input into a scene analyzer 106 and/or a processing pipeline 101. Scene analyzer 106 performs an analysis of the image data (e.g., the image histogram) to generate a scene detection value 108 for the image data 102. The scene detection value 108 is a metric of relative power of IR emissions to visible light, and may be determined based on the intensity (i.e., power) values of IR and the intensity (i.e., power) values of visible light (e.g., of R, G and/or B signals). In embodiments, the scene detection value 108 is computed based on a relationship between the IR intensity values and one or more visible light intensity values. The relationship may be, for example, a ratio between the IR intensity values and one or more visible light intensity values. In one embodiment, a ratio is computed between one or more IR intensity values and one or more G intensity values.

In one embodiment, scene analyzer 106 computes an average IR intensity based on signals from one or more of the IR pixel sensors and computes an average visible light intensity based on signals from one or more of the G pixel sensors. In one embodiment, scene analyzer 106 than computes a ratio of the average IR intensity to the average G intensity. This ratio may be used as the scene detection value 108. Alternatively, the scene detection value 108 may be directly determined from this ratio.

Alternatively, or additionally, scene analyzer 106 may compute averages of G, R and/or B pixels, and may use the averages from the G, R and/or B pixels together with the averages from the IR pixels to determine the scene detection value 108. For example, scene analyzer 106 may determine an average of the R, G and B pixels, and compare this total average to the average of IR pixels to determine the scene detection value 108. Additionally, or alternatively, other statistical values may be determined based on the R, G, B and/or IR pixels, such as median values, maximum values, minimum values, averages over a quartile, and so forth, and such values may be used to determine the scene detection value 108. For example, a ratio of the median, maximum, minimum, average over a quartile, etc. of G, B and/or R pixels to the median, maximum, minimum, average over a quartile, etc. of IR pixels may be computed and used for the scene detection value 108.

In some embodiments, data from an entire image is used to determine the scene detection value 108. For example, averages or other statistical values may be determined based on data from all of the G pixels and data from all of the IR pixels. Alternatively, data from less than the entire image may be used to determine the scene detection value 108. For example, some regions of a scene may be more important than other regions of the scene for later processing and/or decisions. One example is a region of the image that depicts an occupant and/or a driver. Accordingly, in some embodiments the scene analyzer 106 may use just data from a region of an image for determining the scene detection value 108 (e.g., a fixed area where a driver is generally located or a dynamically determined area that has been identified based on, for example, object detection and/or classification using a trained machine learning model). In some embodiments, the scene analyzer applies weights to values from different regions/pixels (e.g., to determine a weighted average of IR values and/or visible light values), where some regions/pixels may be weighted more heavily than others for the computation.

The scene detection value 108 may be used to determine an amount of IR to use in an image and/or to determine how to modify the image to account for the amount of IR that is to be used. Once the scene detection value 108 is computed, one or more quantities 110 may be determined based on the scene detection value 108. Examples of such quantities 110 include quantity 110A, which is an IR subtraction factor, quantity 110B, which is a white balance correction factor, quantity 110C, which is a color correction factor, and quantity 110D, which is a color saturation factor. Each of the quantities 110 may be used at different stages of processing pipeline 101 to process the image data 102. These quantities 110 compensate for the side effects caused by the amount of IR signal that is not removed from the color channels.

Visible light sensor pixels generally detect IR radiation as well as radiation for the specific wavelength of visible light that they are configured to detect. Conventionally, infrared correction is performed for RGB-IR image data by determining intensity values of IR sensor pixels and then entirely subtracting those intensity values from intensity values of surrounding visible light sensor pixels (e.g., R, G, and B sensor pixels). However, embodiments take advantage of the fact that visible light sensor pixels detect IR radiation to improve a resolution of images for medium and low light conditions by choosing not to subtract out all of the IR contribution to intensity values of visible light sensor pixels under certain conditions.

In embodiments, an IR subtraction factor (e.g., quantity 110A) is determined based on the scene detection value 108. The IR subtraction factor controls an amount of infrared correction 112 to perform. Accordingly, the IR subtraction factor controls an amount of an IR contribution to subtract from a visible light sensor pixel value for a given image. Based on the IR subtraction factor (quantity 110A), a fractional amount of the IR contribution to the visible light sensor pixel value may be subtracted out for infrared correction 112. In one embodiment, the IR subtraction value is a factor having a value of between 0 and 1.

In some embodiments, once the IR subtraction factor (quantity 110A) is determined, the IR subtraction factor may be used to perform infrared correction 112 according to the following equation:

$$P_{out}(x,y) = P_{in}(x,y) - I_L * IR_{SubtractionFactor}$$

where $P_{in}$ is an input pixel value for a pixel having coordinates (x,y) wherein $P_{out}$ is an output pixel value for the pixel at coordinates (x,y), wherein $IR_{SubtractionFactor}$ is the determined IR subtraction factor, and wherein $I_L$ is a local IR average at the pixel having the coordinates (x,y).

In one embodiment, the scene detection value can be anywhere between 0 and 1. For example, an IR intensity value to visible light intensity value ratio of 1:100 (which corresponds to a well-lit or bright scene) may cause a scene detection value to be close to 0 (e.g., 0.01) and an IR intensity value to visible light intensity value ratio of 1:1 (which corresponds to a poorly-lit or dark scene) may cause a scene detection value to be 1. In an example, if a scene detection value is close to zero, indicating that a scene is well lit or in full sunlight, the IR subtraction factor may be 1 and the entire IR contribution may be subtracted from the visible light pixel sensor value. On the other hand, if a scene detection value is close to 1, indicating that a scene is poorly lit or in darkness, the IR subtraction value may be 0 and none or the IR contribution may be subtracted from the visible light pixel sensor value. For intermediate scene detection values (e.g., of about 0.2 to about 0.8, or about 0.3 to about 0.7, or about 0.4 to about 0.6), an IR subtraction factor may have values ranging from, for example, about 0.1 to about 0.9. There may be an inverse relationship between the scene detection value and the IR subtraction factor. Accordingly, as the scene detection value increases, the IR subtraction factor may decrease. The inverse relationship between the scene detection value and the IR subtraction factor may be a linear or non-linear relationship.

Figure 2:
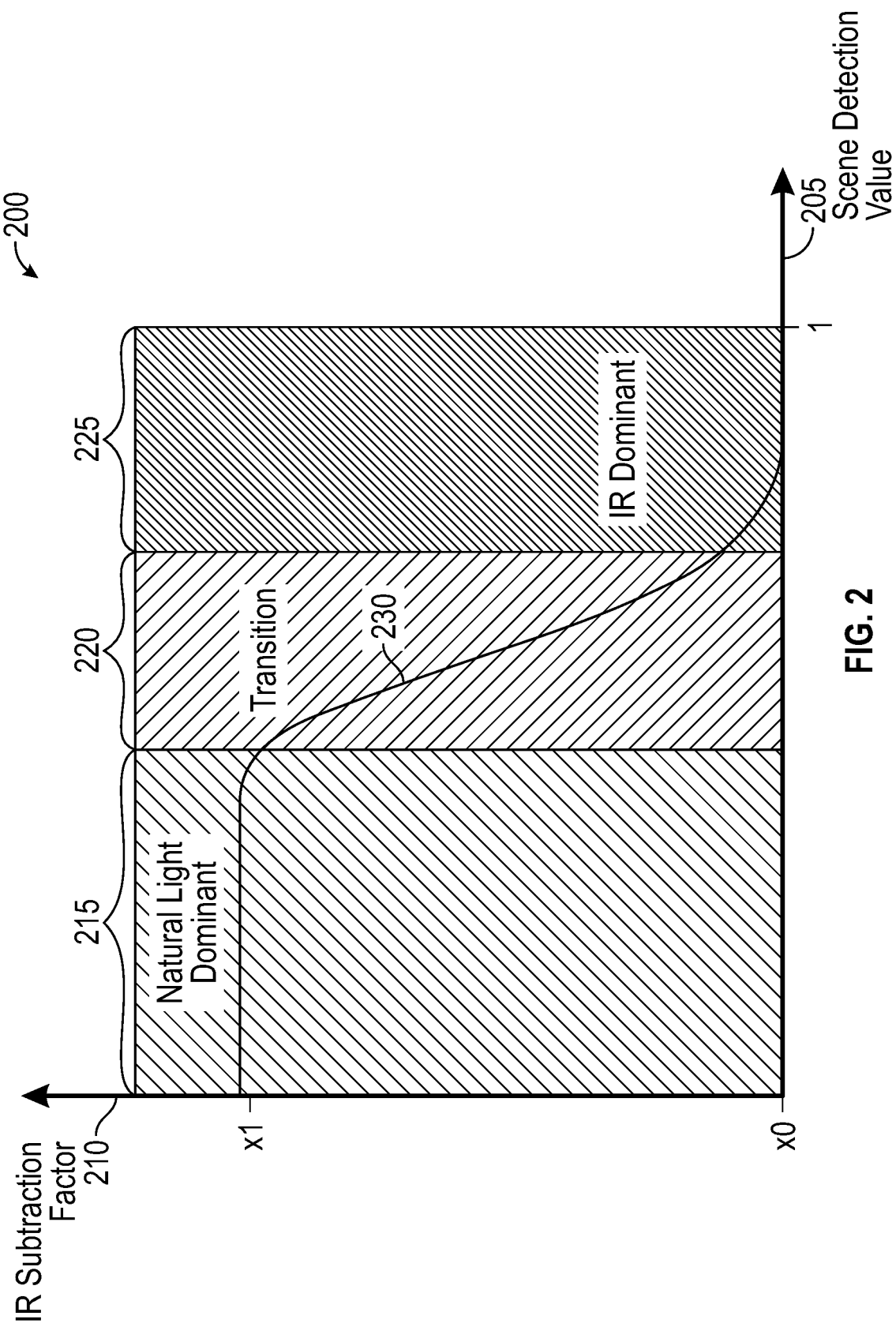
FIG. 2 is a conceptual IR subtraction factor curve, in accordance with some embodiments of the present disclosure.

FIG. 2 is chart 200 showing a conceptual IR subtraction factor curve 230, in accordance with some embodiments of the present disclosure. An x-axis of the chart corresponds to scene detection values 205, and a y-axis of the chart corresponds to IR subtraction factors 210. The IR subtraction factor curve 230 is divided into three conceptual zones, including a natural light dominant zone 215, a transition zone 220 and an IR dominant zone 225. In the natural light dominant zone 215, there is generally a large amount of background light, which causes the intensity values for the visible light sensor pixels to be relatively high, resulting in high quality image data with a higher color fidelity than other regions. Accordingly, for the natural light dominant zone IR contribution to the intensity value of the visible light sensor pixels is unhelpful and the IR subtraction factor is one (i.e., 100% of the IR contribution is removed from the intensity values for the visible light sensor pixels). In one example, the natural light dominant zone includes scene detection values of 0 to about 0.4.

In the transition zone 220 there is less natural light in the scene than in the natural light dominant zone 215. As a result, the intensity values for the visible light sensor pixels is lower for the transition zone 220 than for the natural light dominant zone 215. By leveraging some of the IR contribution to the intensity values for the visible light sensor pixels (e.g., not subtracting out all of the IR contribution), overall intensity values can be increased, which can improve SNR. Accordingly, for scene detection values in the transition zone 220, the IR subtraction factor 210 may steadily decrease with an increase in the scene detection value 205.

RGB-IR cameras output their own IR light to illuminate a scene. As natural or background light decreases in a scene (e.g., at night) the IR light output by the RGB-IR camera becomes dominant. In the IR dominant zone 225, most or all of the contribution to the intensity values measured by the visible light sensor pixels is from IR. Traditionally, RGB-IR cameras switch to using only the IR sensor pixel information when there is little background light (e.g., in the IR dominant zone 225). However, this reduces a resolution of generated images to ¼ of the resolution achieved under naturally lit conditions.

In embodiments, data from the visible light sensor pixels is used even in low light situations. In embodiments, in the IR dominant zone 225 the IR subtraction value is at or close to 0. As a result, little to no IR contribution is removed from the intensity values of visible light sensor pixels. Accordingly, data remains available for most or all of the sensor pixels of the RGB-IR camera even in low light settings. This causes a resolution of images generated in such low light settings to be the standard resolution that is achievable during settings with better lighting.

In IR dominant settings, most or all of the radiation that is measured is IR radiation. Since the same wavelength of radiation (i.e., IR radiation) is being measured by all sensor pixels, color information may be lost. Accordingly, generated images may be monochrome images. However, those monochrome images are of much higher resolution than has traditionally been achievable using RGB-IR cameras in low light settings.

Returning to FIG. 1, adjustments to the infrared correction 112 may cause changes to white balance, color correction, color saturation, and so on. By not removing all of the IR contribution to the visible light sensor pixel values under all conditions, a single white balance correction, a single color correction, a single color saturation correction, etc. cannot be computed a priori for an RGB-IR camera. Instead, different adjustments should be made for white balance correction 114, color correction 118 and color saturation 124, depending on an amount of infrared correction that is performed. Accordingly, quantities 110 that are determined by scene analyzer 106 may include a white balance correction factor (quantity 110B), a color correction factor (quantity 110C), a color saturation factor (quantity 110D), and so on.

In some embodiments, some or all of the quantities 110 are determined using one or more functions that relate scene detection values to one or more of the quantities 110. Accordingly, a computed scene detection value may be input into the function, which may return values for one or more quantities 110. In some embodiments, some or all of the quantities 110 are determined using one or more lookup tables. The scene detection value 108 may be used as an index into the lookup table(s), and quantized values for one or more of the quantities 110 may be included in entries of the lookup table(s).

In an example, if a scene is detected to be a night-time scene (e.g., scene detection value 108 is high), then IR is dominant, and there may be close to a 1:1 average pixel value ratio of IR to G. For such a high scene detection value 108, there may be little to no IR subtraction at infrared correction 112, color saturation 124 may apply desaturation to the color image (color saturation factor may be low), and white balance correction factor and color correction factor may be zero at color correction 118 and color saturation 124 (resulting in AWB gains to be unity and an unchanged CCM identity matrix to be used under low light conditions). The output under such circumstances may be a monochrome image.

In another example, if a scene is detected to be a day-time scene (e.g., scene detection value 108 is low), then visible light is dominant, and there may be a low IR to visible light pixel value ratio (e.g., 1:50, 1:100, etc.). For such a low scene detection value 108, there may be full IR subtraction at infrared correction 112, color saturation 124 and color correction 118 may be left as is (e.g., not modified by correction factors) to preserve chroma information, and so on. The output under such circumstances may be a color image. The percentage of IR subtraction and the amount of desaturation may share an inverse relationship depending on ambient visible light in the scene in embodiments.

Embodiments enable the tuning of an amount of IR removal based on lighting conditions, which is a compromise between better SNR and color fidelity for images in medium to low light scenes.

Figure 3:
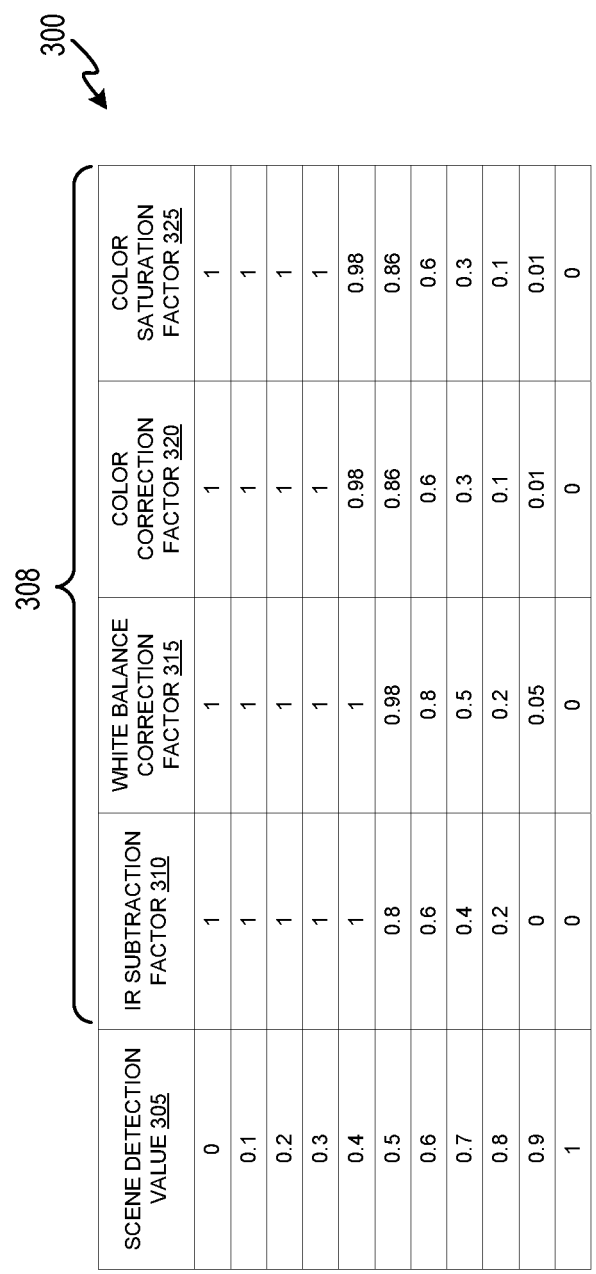
FIG. 3 is a lookup table for determining one or more quantities used to adjust an image based on a scene detection value, in accordance with some embodiments of the present disclosure.

FIG. 3 is an example lookup table 300 usable for determining one or more quantities 308 (e.g., corresponding to quantities 110 of FIG. 1) used to adjust an image based on a scene detection value 305, in accordance with some embodiments of the present disclosure. Once the scene detection value 305 is computed, it may be used as an index to find an entry (e.g., a row) in the lookup table 300. The entry may include a first value for an IR subtraction factor 310, a second value for a white balance correction factor 315, a third value for a color correction factor 320, a fourth value for a color saturation factor 325, and so on. It should be noted that the example values included in the example lookup table 300 are for illustration purposes only, and that other values may be used.

Returning to FIG. 1, after infrared correction 112, automated white balance correction (AWB) 114 may be performed. White balance (WB) is the process of removing unrealistic color casts, so that objects which appear white in person are rendered white in images. White balance is performed by determining an amount of gain to apply to each of the color channels, where each color channel may receive a different amount of gain. The goal of AWB is to make all gray objects in a scene have an equal amount of red, green and blue intensity. Proper white balance takes into account the "color temperature" of a light source, which refers to the relative warmth or coolness of white light. Human eyes are very good at judging what is white under different light sources, but digital cameras often have great difficulty with auto white balance (AWB) and can create unsightly blue, orange, or even green color casts.

Performing correct white balance correction 114 is made more challenging when an IR signal is not removed from visible light sensor pixel values. The IR signal acts as an offset. As a result, when AWB is performed on an image in which an IR signal remains, a different amount of gain may be applied to the IR offset in each of the color channels, which can result in a purple cast. Accordingly, a white balance correction factor is applied in embodiments, where the white balance correction factor is based on an amount of the IR signal that is not being removed from the visible light sensor pixel values. In particular, by leaving in a portion of the IR signal, an offset is introduced into each of the color channels. This offset can manifest as a purple color. In one embodiment, as more IR light is retained, the system moves away from applying a full white balance gain and towards applying an equal gain to each color channel. For example, for a pure IR signal (e.g., at night), no gain may be applied to any of the color channels because there is no color signal to be corrected. On the other end of the spectrum, for a pure color signal (e.g., in which all IR signal has been removed from visible light sensor pixel values), the standard correct white balance amounts would be used (e.g., as determined based on calibration of the system). In between the pure color signal and the pure IR signal, some intermediate white balance factor (e.g., between 0 and 1) may be determined.

The white balance correction 114 may be performed on the image data post infrared correction 112 based on a determined white balance correction factor. In some embodiments, white balance correction factor (quantity 110B) may be used to perform white balance correction 114 according to the following equation:

$$\begin{bmatrix} R \\ G \\ B \end{bmatrix}_{out} = \left( AWB_{factor} * \begin{bmatrix} WB_R & 0 & 0 \\ 0 & WB_G & 0 \\ 0 & 0 & WB_B \end{bmatrix} + (1 - AWB_{factor}) \begin{bmatrix} 1 & 0 & 0 \\ 0 & 1 & 0 \\ 0 & 0 & 1 \end{bmatrix} \right) \begin{bmatrix} R \\ G \\ B \end{bmatrix}_{in}$$

where $\begin{bmatrix} R \\ G \\ B \end{bmatrix}_{in}$ is a vector of input red, green and blue pixel values, $AWB_{factor}$ is the white balance correction factor, $WB_R$, $WB_G$ and $WB_B$ are initial red, green and blue white balance correction values for images from the RGB-IR camera (e.g., as determined during calibration), and $$\begin{bmatrix} R \\ G \\ B \end{bmatrix}_{out}$$

is a vector of red, green and blue output pixel values.

After white balance correction 114, standard demosaicing 116 may be performed. Demosaicing is a digital image process used to construct a full color image from incomplete color samples output from an image sensor overlaid with a color filter array. The RGB-IR camera may include multiple sensor pixels, each associated with a particular wavelength of radiation (e.g., a modified Bayer pattern including R, G, B and IR sensor pixels). In the demosaic process, the data from surrounding pixels associated with one or more wavelengths that are different from a sensor pixel in question may be used to estimate (e.g., via interpolation) the values (i.e., power or intensity values) of the one or more wavelengths for the sensor pixel in question. For example, in the demosaic process the contents of an IR-only sensor pixel (photo site) may be replaced with color information that should have been there based on interpolation of the same color data from surrounding color sensor pixels.

After demosaicing 116, color correction 118 may be performed using a determined color correction factor. Due to the spectral characteristics of the optical lens and optical filters used in a camera system, the lighting of the scene, and the spectral characteristics of the color filters of the image sensor, the RGB data of the camera may not provide a faithful color rendition. Specifically, the spectral characteristics of the image sensor may be different from the spectral response of the human eye. This unfaithful color rendition is mostly generated from the differences between the spectral characteristics of an imager color filter array and the spectral response of the human eye, and the lighting of the scene. The color error caused from the lighting of the scene can be controlled by an auto white balance. But the auto white balance does not sufficiently reduce the color error generated by the spectral characteristics of the imager color filter array. Two kinds of color correction have been mainly used to compensate for this color error. One is the hue and saturation control method using the control of Cr and Cb. The other is the 3×3 color matrix method.

For pure IR signals (e.g., at night) there is no color data, and thus there is no need for color correction. Accordingly, an identity matrix may be used for color correction for pure IR signals. On the other hand, for pure color signals there will be strong terms on the color matrix's diagonal and negative terms on the off-diagonal values. There may be a correct known accurate color correction value that has been determined based on calibration, but this correct correction value may only apply when the IR signal is entirely removed from the visible light pixel sensor values. Some factor (e.g., having a value between 0 and 1) may be computed and applied to the correct correction value based on an amount or IR that is left in the signal.

In some embodiments, a color correction factor (quantity 110C) may be used to perform color correction 118 according to the following equation:

$$\begin{bmatrix} R \\ G \\ B \end{bmatrix}_{out} = \left( CCM_{factor} * \begin{bmatrix} m_{11} & m_{12} & m_{13} \\ m_{21} & m_{22} & m_{23} \\ m_{31} & m_{32} & m_{33} \end{bmatrix} + (1 - CCM_{factor}) \begin{bmatrix} 1 & 0 & 0 \\ 0 & 1 & 0 \\ 0 & 0 & 1 \end{bmatrix} \right) \begin{bmatrix} R \\ G \\ B \end{bmatrix}_{in}$$

where $\begin{bmatrix} R \\ G \\ B \end{bmatrix}_{in}$ is a vector of input red, green and blue values for a pixel, $CCM_{factor}$ is the color correction factor, $m_{11}$-$m_{33}$ are values of a 3×3 color matrix used for color correction, and $$\begin{bmatrix} R \\ G \\ B \end{bmatrix}_{out}$$

is a vector of red, green and blue output values for the pixel. In one embodiment, the 3×3 matrix coefficients ($m_{11}$-$m_{33}$) are derived by least squares polynomial modeling between camera RGB output signals and CIE XYZ tristimulus values of a target Macbeth Color Checker. The 3×3 matrix coefficients may be derived using other techniques as well.

After color correction 118 is performed, global tone mapping 120 may be performed. After global tone mapping 120, local tone mapping 122 may be performed.

After global tone mapping 120 and local tone mapping 122, color saturation 124 (i.e., desaturation) may be performed using a determined color saturation factor (quantity 110D). In one embodiment, the color saturation factor has a value of between 0 and 1. Adjusting color saturation 124 may directly control the hue, saturation and/or brightness of an image. Some images may be saturated with color, and performing desaturation for such images may improve image quality. Conversely, some images may benefit from increasing color saturation.

In some embodiments, color saturation factor (quantity 110D) may be used to perform color saturation correction 124 in the YUV color space according to the following equations:

$$Y_{out}(x,y) = Y_{in}(x,y) \qquad \text{a.}$$

$$U_{out}(x,y) = U_{in}(x,y) * SAT_{factor} \qquad \text{b.}$$

$$V_{out}(x,y) = V_{in}(x,y) * SAT_{factor} \qquad \text{c.}$$

Where $Y_{in}$, $U_{in}$ and $V_{in}$ are the respective input YUV values for a pixel at coordinates (x,y), $SAT_{factor}$ is the color saturation correction factor, and $Y_{out}$, $U_{out}$ and $V_{out}$ are the respective output YUV values for the pixel at coordinates (x,y).

Processing pipeline 101 is not intended to represent a complete processing pipeline, and one or more additional operations may be performed in processing pipeline 101 in addition to those called out herein. Such additional operations are standard operations to ISP pipelines, and are not material to the present discussion and so are omitted for the sake of clarity and brevity. However, it should be understood that processing pipeline 101 may include such additional operations, which may be performed before, between and/or after the enumerated operations.

The processing pipeline 101 outputs transformed image data 130, which may include a transformed image that includes data from only visible light pixel sensors or from both visible light pixel sensors and IR pixel sensors, as appropriate. Depending on the lighting conditions and/or other factors, the transformed image data may include a color image or a monochrome image, and may be in a same color space as input image data 102 or in a different color space as input image data 102. For example, the input image data 102 may be in a RGB color space, and transformed image data 130 may be in a luminance-chrominance (YUV) color space.

The image output by the processing pipeline 101 may be a full resolution image, regardless of the amount of visible light in an imaged scene. The full resolution image output may be in color in scenes with sufficient natural light, and transitions smoothly to full resolution monochrome images in scenes with insufficient natural light for color.

Figure 4:
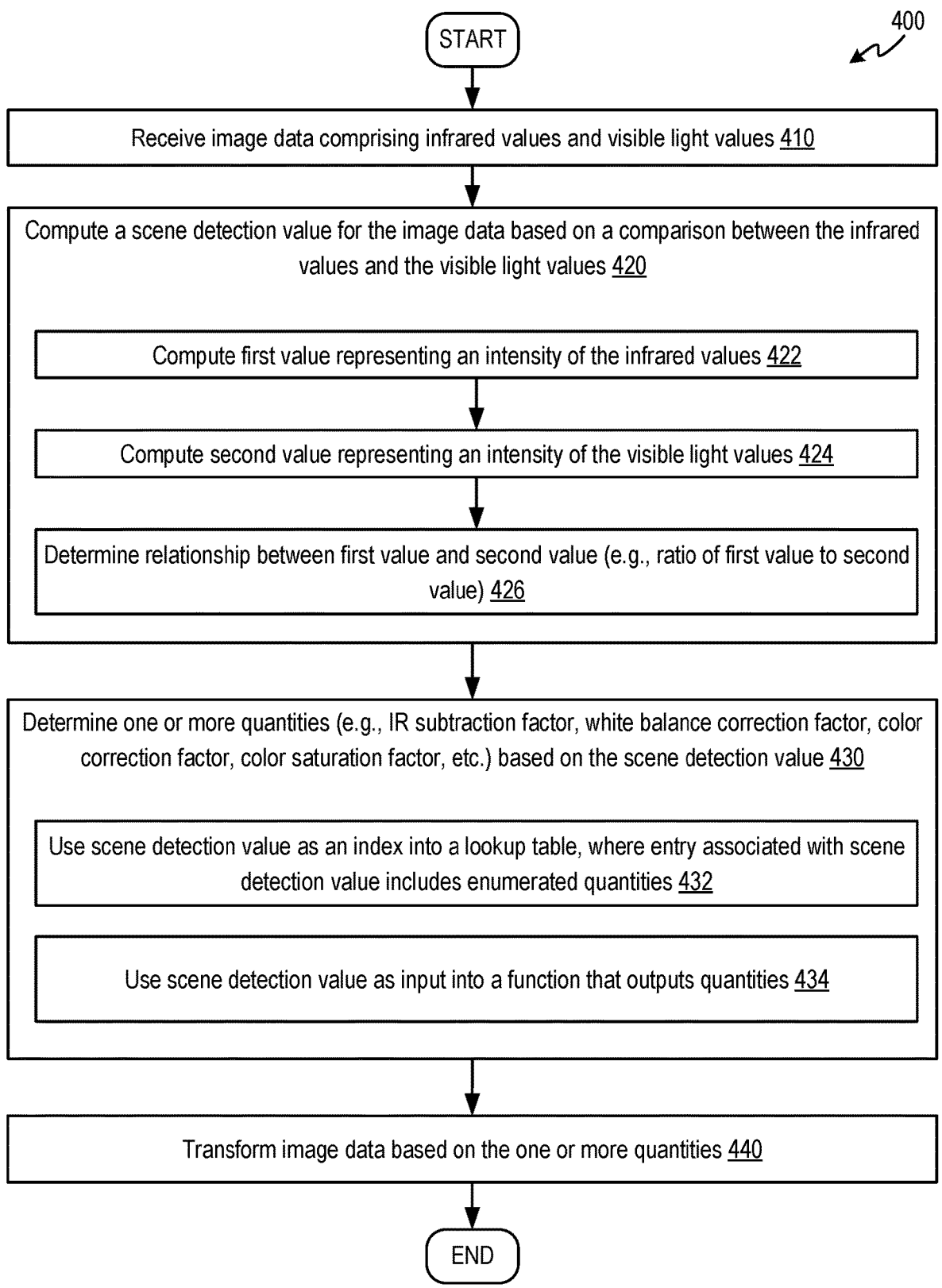
FIG. 4 is a flow chart of a method for adjusting image data that includes infrared values and visible light values to generate updated images, in accordance with some embodiments of the present disclosure.

FIG. 4 depicts a flow diagram of one illustrative example of a method 400 for processing image data output by an RGB-IR camera and outputting a transformed image based on the processing, in accordance with embodiments of the present disclosure. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed using processing unit 104 as shown in FIG. 1.

Method 400 may be performed by processing logic of a processing device (e.g., processing unit 104) and may begin at operation 410. At operation 410, the processing logic may receive image data comprising infrared values and visible light values. The image data may have been output by an RGB-IR camera in embodiments. The image may correspond to a still image (e.g., photograph), an image in a sequence of images (e.g., video frames), or a combination thereof. In embodiments, the image data includes a histogram of pixel values.

At operation 420, the processing logic can process the image data to compute a scene detection value. In embodiments, processing logic performs a comparison between one or more IR values from the image data and one or more visible light values (e.g., G values) from the image data, and determines the scene detection value based on the comparison. The scene detection value may be based on a relationship between the IR values and the visible light values.

In one embodiment, at block 422 processing logic computes a first value representing an intensity of the infrared values. The first value may be computed based on computing an average, median, mean, maximum, average per quartile, or other statistical value for the infrared values of the image (e.g., from the image histogram).

In one embodiment, at block 424 processing logic computes a second value representing an intensity of the visible light values. The second value may be computed based on computing an average, median, mean, maximum, average per quartile, or other statistical value for the visible light values of the image (e.g., from the image histogram). In one embodiment, the second value is determined based on G values from the image histogram.

In one embodiment, at block 426 processing logic determines a relationship between the first value and the second value. In one embodiment, the relationship is a ratio of the first value to the second value. A low ratio (and a corresponding low scene detection value) may indicate a scene with abundant ambient light, while a high ratio (and a corresponding high scene detection value) may indicate scene in darkness.

At operation 430, the processing logic can determine one or more quantities based on the scene detection value. The determined quantities may include, for example, an IR subtraction factor, a white balance correction factor, a color correction factor and/or a color saturation factor. In embodiments, a magnitude of the IR subtraction factor varies inversely to a magnitude of the scene detection value. In embodiments, a magnitude of the color saturation factor varies directly to the magnitude of the scene detection value.

In one embodiment, at block 432 processing logic uses the scene detection value as an index into a lookup table. An entry in the lookup table may correspond to the computed scene detection value, and may include one or more enumerated quantities, such as a specified IR subtraction factor, white balance correction factor, color correction factor and/or color saturation factor for the scene detection value. Each scene detection value may be associated with a set of quantities.

In one embodiment, at block 434 processing logic uses the scene detection value as an input into one or more function, which may output quantities (e.g., an IR subtraction factor, white balance correction factor, color correction factor, color saturation factor, etc.).

At block 440, processing logic transforms the image data based on the one or more quantities. This may include subtracting some amount of IR contribution from R, G and B pixel values, performing white balance correction using a determined white balance correction factor, performing color correction using a determined color correction factor, performing desaturation or saturation using a determined color saturation factor, and so on. The transformed image data may result in a full resolution image that may be a color image or monochrome image determining on a lighting of an imaged scene (e.g., color in abundant light and monochrome in low light). In some embodiments, the output image is in a YUV color space.

Figure 5:
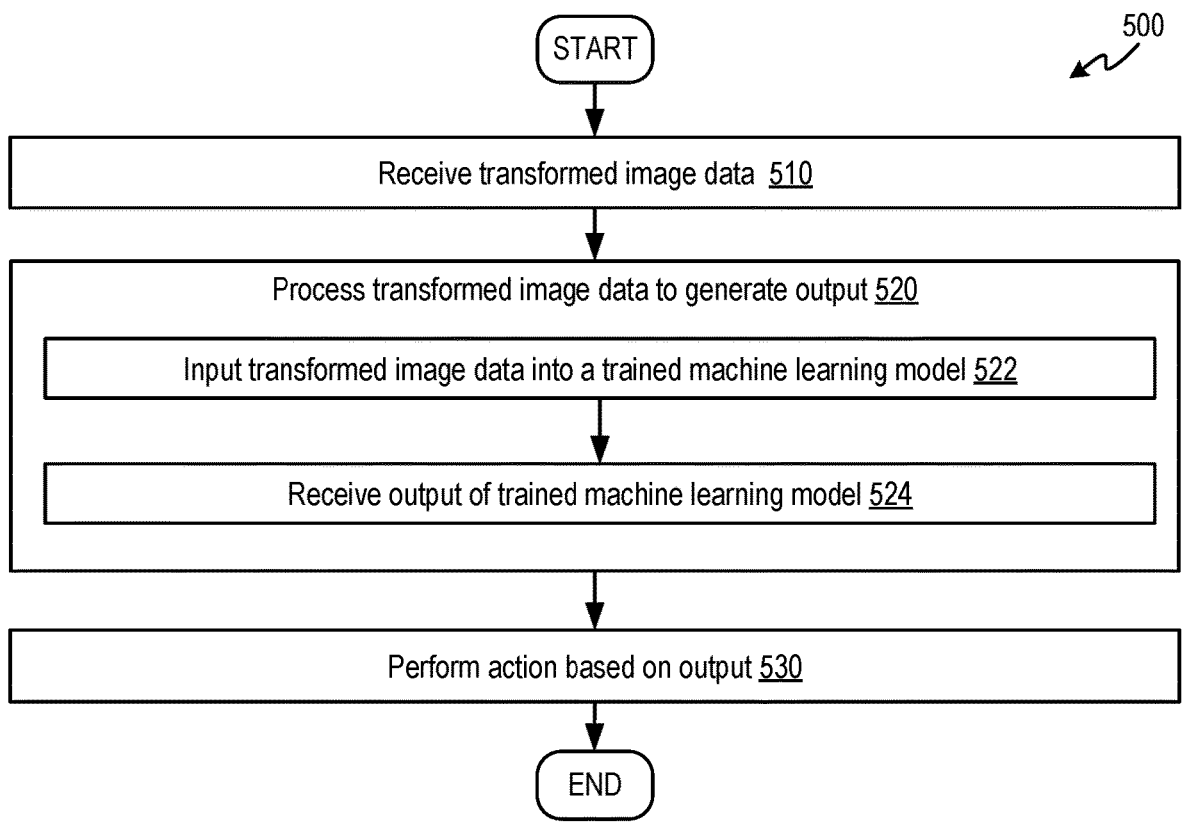
FIG. 5 is a flow chart of a method for processing a transformed image (e.g., that has been transformed in accordance with the method of FIG. 4) using a trained machine learning model, in accordance with some embodiments of the present disclosure.

FIG. 5 is a flow chart of a method for processing a transformed image (e.g., that has been transformed in accordance with the method of FIG. 4) using a trained machine learning model, in accordance with some embodiments of the present disclosure. At block 510 of method 500, processing logic receives transformed image data (e.g., that was processed according to method 400). The transformed image data may include a full resolution image, which may be a color image or a monochrome image, determining on lighting conditions.

At block 520, processing logic processes the transformed image data to generate an output. In one embodiment, at block 522 the transformed image data is input into a trained machine learning model. The trained machine learning model processes the image data and generates an output, which is received at block 524.

The trained machine learning model may be, for example, an artificial neural network, a support vector machine, a random forest algorithm, a decision tree, a Hidden Markov Model (HMM), Gaussian Mixture Model (GMM), a regression model, or other type of machine learning model. Since the input image data is for a full resolution image, which has a highest possible SNR, an accuracy of the output of the machine learning model can be increased as opposed to if a ¼ resolution monochrome image was input into the machine learning model. The machine learning model may be trained to generate an output that is a prediction, a classification, an estimation, etc. The output may include a confidence rating, and the confidence rating (and accuracy) of the machine learning model may be maximized due to transformation of the image using method 400 prior to input into the trained machine learning model.

In the example of a DMS, the machine learning model may output an activity classification for an activity of a driver for an automobile (e.g., indicating whether a driver's hands are on a steering wheel), an attention classification or attention level determination for the driver (e.g., indicating whether a driver's eyes are on the road), and so on. In the example of an OMS, the machine learning model may output an indication that one or more occupants are detected. This may be used to alert the driver of an infant in a rear seat, for example, when the driver turns off the automobile.

One type of machine learning model that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes; and the fourth layer may output a classification or prediction, for example. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future scans and make predictions based on this continuous scanning information. RNNs may be trained using a training dataset to generate a fixed number of outputs (e.g., to classify time varying data such as video data as belonging to a fixed number of classes). One type of RNN that may be used is a long short term memory (LSTM) neural network.

A common architecture for such tasks is LSTM (Long Short Term Memory). Unfortunately, LSTM is not well suited for images since it does not capture spatial information as well as convolutional networks do. For this purpose, one can utilize ConvLSTM—a variant of LSTM containing a convolution operation inside the LSTM cell. ConvLSTM is a variant of LSTM (Long Short-Term Memory) containing a convolution operation inside the LSTM cell. ConvLSTM replaces matrix multiplication with a convolution operation at each gate in the LSTM cell. By doing so, it captures underlying spatial features by convolution operations in multiple-dimensional data. The main difference between ConvLSTM and LSTM is the number of input dimensions. As LSTM input data is one-dimensional, it is not suitable for spatial sequence data such as video, satellite, radar image data set. ConvLSTM is designed for 3-D data as its input. In one embodiment, a CNN-LSTM machine learning model is used. A CNN-LSTM is an integration of a CNN (Convolutional layers) with an LSTM. First, the CNN part of the model processes the data and a one-dimensional result feeds an LSTM model.

At block 530, processing logic performs one or more action based on the output generated at block 520. The action may be, for example, generating an alert if a driver's attention is not on the road, generating an alert as a driver exits a car that there is a child in a back seat of the car, and so on.

Figure 6:
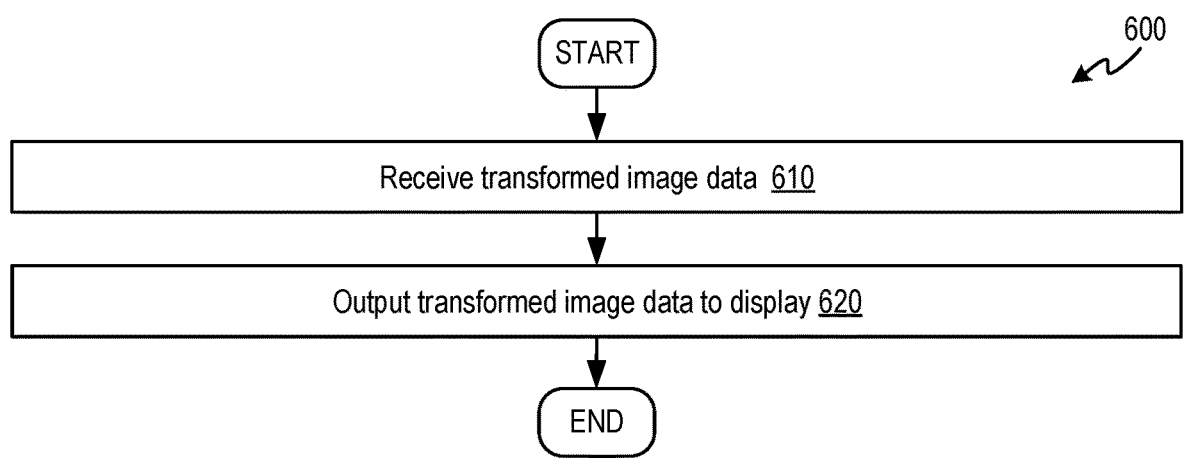
FIG. 6 is a flow chart of a method for displaying a transformed image (e.g., that has been transformed in accordance with the method of FIG. 4), in accordance with some embodiments of the present disclosure.

FIG. 6 is a flow chart of a method for displaying a transformed image (e.g., that has been transformed in accordance with the method of FIG. 4), in accordance with some embodiments of the present disclosure. At block 610, processing logic receives transformed image data (e.g., that was transformed according to method 400). At block 620, processing logic outputs the transformed image data to a display. For example, an RGB-IR camera may be an in-cabin camera that generates images of an automobile's occupants. The cabin may include a monitor, and the transformed image may be output to the monitor. For example, an image may be output to a display in a car's dashboard showing an image of an interior of the car. The image may be a full resolution image regardless of lighting, and may be a color image when there is ambient visible light (e.g., during the day) and a monochrome image when there is no or little ambient visible light (e.g., at night).

Figure 7:
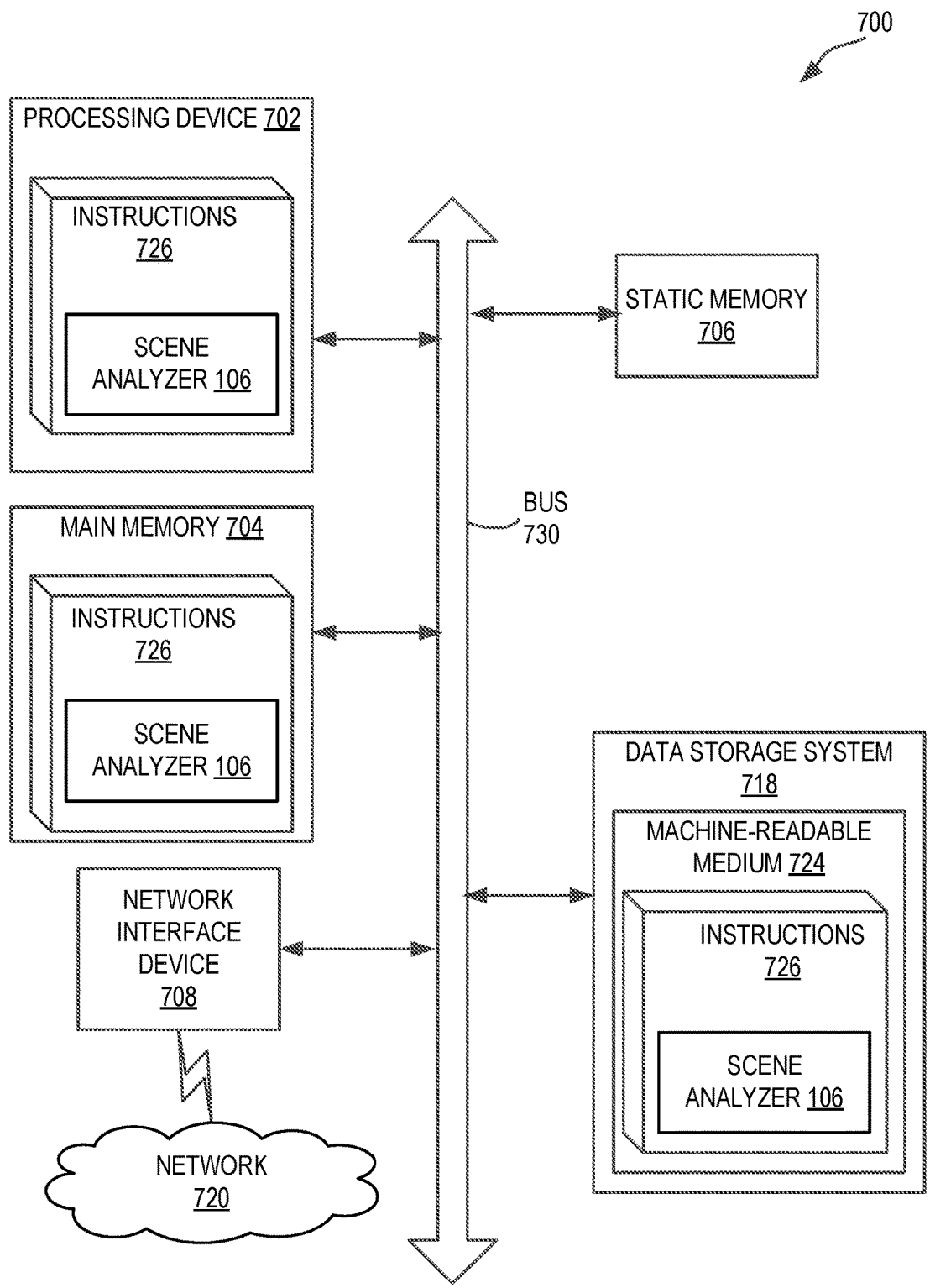
FIG. 7 illustrates an example computing device that includes a scene analyzer for modifying images, in accordance with some embodiments of the present disclosure.

FIG. 7 illustrates an example machine of a computer system 700 within which a set of instructions, for causing the machine to perform any one or more of the methodologies discussed herein, can be executed. In some embodiments, the computer system 700 can be a computing device that includes a processor with a cache controller, a memory controller, or combination thereof. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702 (e.g., Processor 200), a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as a data processing unit (DPU), an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media.

In one embodiment, the instructions 726 include instructions to implement functionality corresponding to the scene analyzer 106 of FIG. 1. The instructions may additionally or alternatively include instructions to implement functionality corresponding to infrared correction and/or any other function of processing pipeline 101. While the machine-readable storage medium 724 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In embodiments the technology described herein is applied to a driver monitoring system (DMS) and/or to an occupant monitoring system (OMS) of an automobile. The automobile may be an autonomous vehicle, a semi-autonomous vehicle or a manually driven vehicle. The DMS and OMS systems may operate on both visible and near-IR light. Application of the technology described herein to DMS and OMS systems enable teleconferencing and/or passenger monitoring applications that benefit from color alongside machine vision monitoring applications using a single camera for cost reduction.

Figure 8A:
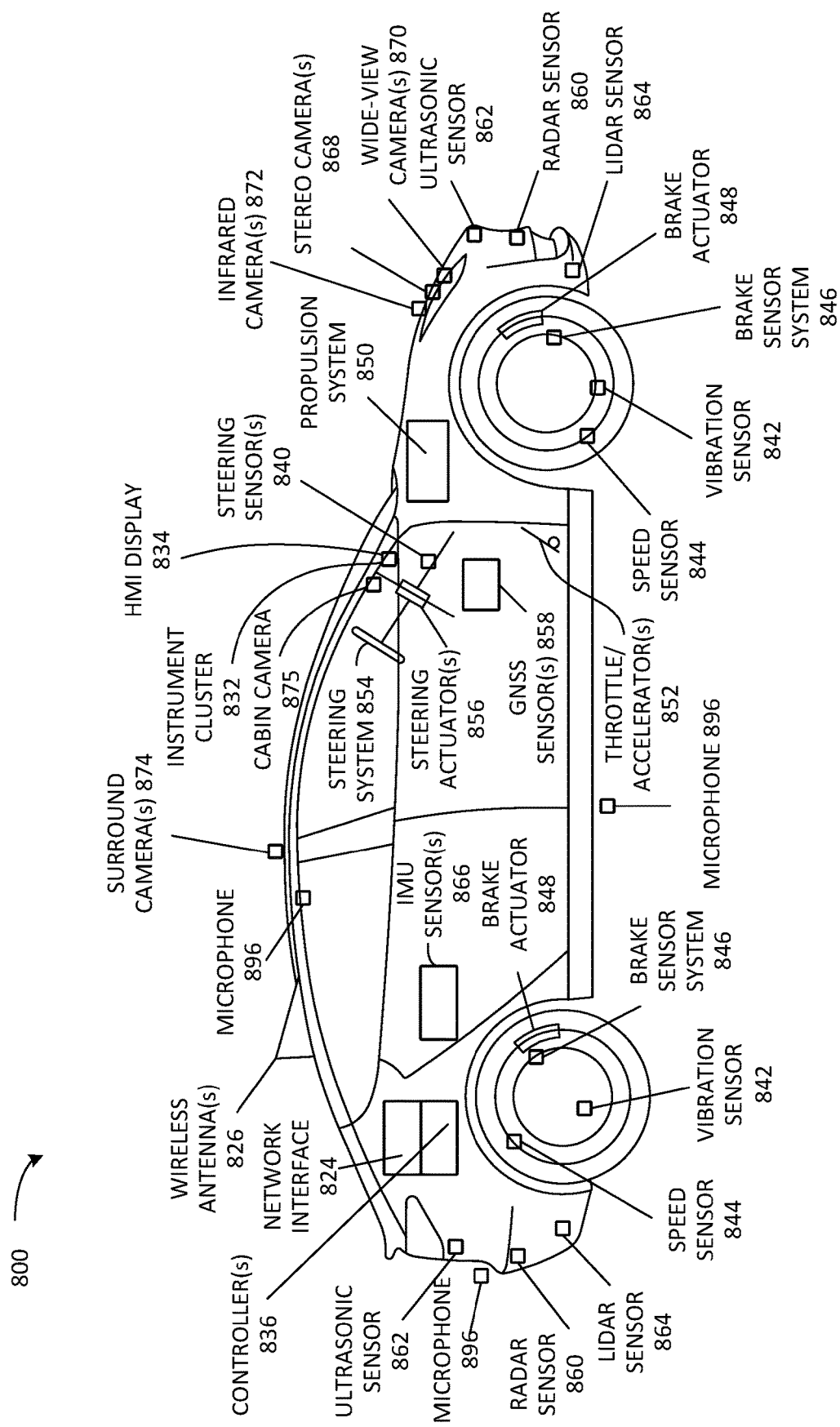
FIG. 8A illustrates an example of an autonomous vehicle, according to at least one embodiment.

FIG. 8A illustrates an example of an autonomous vehicle 800, according to at least one embodiment. In at least one embodiment, autonomous vehicle 800 (alternatively referred to herein as "vehicle 800") may be, without limitation, a passenger vehicle, such as a car, a truck, a bus, and/or another type of vehicle that accommodates one or more passengers. In at least one embodiment, vehicle 800 may be a semi-tractor-trailer truck used for hauling cargo. In at least one embodiment, vehicle 800 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 800 may be capable of functionality in accordance with one or more of Level 1 through Level 5 of autonomous driving levels. For example, in at least one embodiment, vehicle 800 may be capable of conditional automation (Level 3), high automation (Level 4), and/or full automation (Level 5), depending on embodiment.

In at least one embodiment, vehicle 800 may include, without limitation, components such as a chassis, a vehicle body, wheels (e.g., 2, 4, 6, 8, 18, etc.), tires, axles, and other components of a vehicle. In at least one embodiment, vehicle 800 may include, without limitation, a propulsion system 850, such as an internal combustion engine, hybrid electric power plant, an all-electric engine, and/or another propulsion system type. In at least one embodiment, propulsion system 850 may be connected to a drive train of vehicle 800, which may include, without limitation, a transmission, to enable propulsion of vehicle 800. In at least one embodiment, propulsion system 850 may be controlled in response to receiving signals from a throttle/accelerator(s) 852.

In at least one embodiment, a steering system 854, which may include, without limitation, a steering wheel, is used to steer vehicle 800 (e.g., along a desired path or route) when propulsion system 850 is operating (e.g., when vehicle 800 is in motion). In at least one embodiment, steering system 854 may receive signals from steering actuator(s) 856. In at least one embodiment, a steering wheel may be optional for full automation (Level 5) functionality. In at least one embodiment, a brake sensor system 846 may be used to operate vehicle brakes in response to receiving signals from brake actuator(s) 848 and/or brake sensors.

In at least one embodiment, controller(s) 836, which may include, without limitation, one or more system on chips ("SoCs") (not shown in FIG. 8A) and/or graphics processing unit(s) ("GPU(s)"), provide signals (e.g., representative of commands) to one or more components and/or systems of vehicle 800. For instance, in at least one embodiment, controller(s) 836 may send signals to operate vehicle brakes via brake actuator(s) 848, to operate steering system 854 via steering actuator(s) 856, to operate propulsion system 850 via throttle/accelerator(s) 852. In at least one embodiment, controller(s) 836 may include one or more onboard (e.g., integrated) computing devices that process sensor signals, and output operation commands (e.g., signals representing commands) to enable autonomous driving and/or to assist a human driver in driving vehicle 800. In at least one embodiment, controller(s) 836 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 836 provide signals for controlling one or more components and/or systems of vehicle 800 in response to sensor data received from one or more sensors (e.g., sensor inputs). In at least one embodiment, sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit ("IMU") sensor(s) 866 (e.g., accelerometer(s), gyroscope(s), a magnetic compass or magnetic compasses, magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), cabin cameras 875, long-range cameras (not shown in FIG. 8A), mid-range camera(s) (not shown in FIG. 8A), speed sensor(s) 844 (e.g., for measuring speed of vehicle 800), vibration sensor(s) 842, steering sensor(s) 840, brake sensor(s) (e.g., as part of brake sensor system 846), and/or other sensor types.

In one embodiment, cabin camera(s) 875 is an RGB-IR camera, and generates image data having both a visible light component and an IR component. Controller(s) 836 may process the image data using the techniques described above to generate transformed image data (e.g., by performing method 400). The transformed image data may have an improved SNR and/or image quality and/or resolution as compared to images traditionally generated by RGB-IR cameras. The generated image (i.e., transformed image data) may be input into one or more trained machine learning models by controller(s) 836 and/or may be output for view by a driver or occupant via HMI display 834.

In at least one embodiment, one or more of controller(s) 836 may receive inputs (e.g., represented by input data) from an instrument cluster 832 of vehicle 800 and provide outputs (e.g., represented by output data, display data, etc.) via a human-machine interface ("HMI") display 834, an audible annunciator, a loudspeaker, and/or via other components of vehicle 800. In at least one embodiment, outputs may include information such as vehicle velocity, speed, time, map data (e.g., a High Definition map (not shown in FIG. 8A), location data (e.g., vehicle's 800 location, such as on a map), direction, location of other vehicles (e.g., an occupancy grid), information about objects and status of objects as perceived by controller(s) 836, etc. For example, in at least one embodiment, HMI display 834 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 800 further includes a network interface 824 which may use wireless antenna(s) 826 and/or modem(s) to communicate over one or more networks. For example, in at least one embodiment, network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 826 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

In some embodiments, inference and/or training logic 915, described below, are used to perform inferencing and/or training operations using transformed image data generated as described above. Details regarding inference and/or training logic 915 are provided herein in conjunction with FIGS. 9A and/or 9B. In at least one embodiment, inference and/or training logic 915 may be used for inferencing or predicting operations based, at least in part, on weight parameters calculated using neural network training operations, neural network functions and/or architectures, or neural network use cases described herein.

Figure 8B:
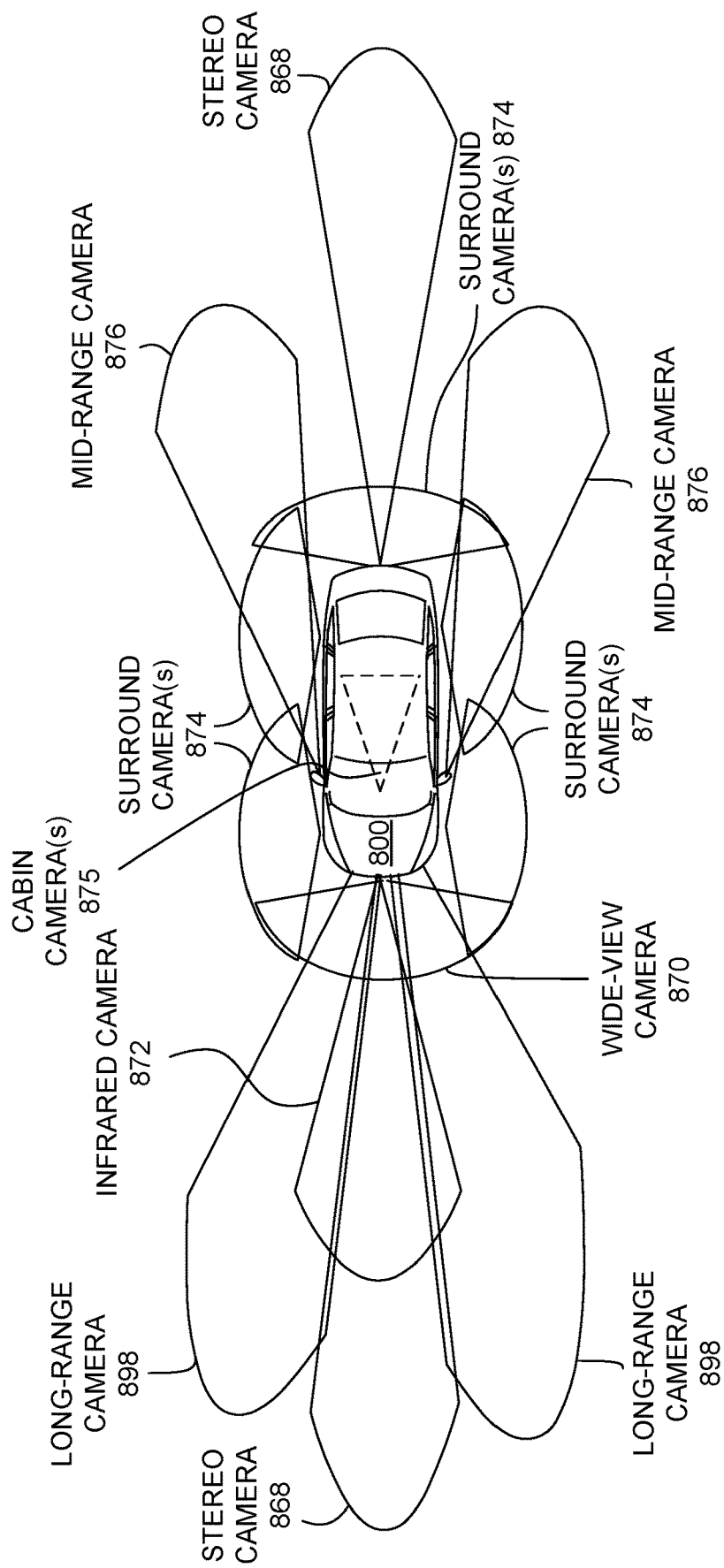
FIG. 8B illustrates an example of camera locations and fields of view for the autonomous vehicle of FIG. 8A, according to at least one embodiment.

FIG. 8B illustrates an example of camera locations and fields of view for autonomous vehicle 800 of FIG. 8A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 800.

In at least one embodiment, camera types for cameras may include, but are not limited to, digital cameras that may be adapted for use with components and/or systems of vehicle 800. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, an RGB-IR color filter array, and/or another type of color filter array. In at least one embodiment, clear pixel cameras, such as cameras with an RCCC, an RCCB, and/or an RBGC color filter array, may be used in an effort to increase light sensitivity. In one embodiment, one or more of the cameras are RGB-IR cameras, and image data generated by the one or more cameras is processed according to the techniques set forth above.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more camera may be mounted in a mounting assembly, such as a custom designed (three-dimensional ("3D") printed) assembly, in order to cut out stray light and reflections from within vehicle 800 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 800 (e.g., front-facing cameras) may be used for surround view, to help identify forward facing paths and obstacles, as well as aid in, with help of one or more of controller(s) 836 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 870 may be used to perceive objects coming into view from a periphery (e.g., pedestrians, crossing traffic or bicycles). Although only one wide-view camera 870 is illustrated in FIG. 8B, in other embodiments, there may be any number (including zero) wide-view cameras on vehicle 800. In at least one embodiment, any number of long-range camera(s) 898 (e.g., a long-view stereo camera pair) may be used for depth-based object detection, especially for objects for which a neural network has not yet been trained. In at least one embodiment, long-range camera(s) 898 may also be used for object detection and classification, as well as basic object tracking.

In at least one embodiment, any number of stereo camera(s) 868 may also be included in a front-facing configuration. In at least one embodiment, one or more of stereo camera(s) 868 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 800, including a distance estimate for all points in an image. In at least one embodiment, one or more of stereo camera(s) 868 may include, without limitation, compact stereo vision sensor(s) that may include, without limitation, two camera lenses (one each on left and right) and an image processing chip that may measure distance from vehicle 800 to target object and use generated information (e.g., metadata) to activate autonomous emergency braking and lane departure warning functions. In at least one embodiment, other types of stereo camera(s) 868 may be used in addition to, or alternatively from, those described herein.

In at least one embodiment, cameras with a field of view that include portions of environment to sides of vehicle 800 (e.g., side-view cameras) may be used for surround view, providing information used to create and update an occupancy grid, as well as to generate side impact collision warnings. For example, in at least one embodiment, surround camera(s) 874 (e.g., four surround cameras as illustrated in FIG. 8B) could be positioned on vehicle 800. In at least one embodiment, surround camera(s) 874 may include, without limitation, any number and combination of wide-view cameras, fisheye camera(s), 360 degree camera(s), and/or similar cameras. For instance, in at least one embodiment, four fisheye cameras may be positioned on a front, a rear, and sides of vehicle 800. In at least one embodiment, vehicle 800 may use three surround camera(s) 874 (e.g., left, right, and rear), and may leverage one or more other camera(s) (e.g., a forward-facing camera) as a fourth surround-view camera.

In at least one embodiment, cabin camera(s) 875 has a field of view that covers driver and/or passenger areas of the vehicle's cabin.

In at least one embodiment, cameras with a field of view that include portions of an environment behind vehicle 800 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 898 and/or mid-range camera(s) 876, stereo camera(s) 868), infrared camera(s) 872, etc.), as described herein.

In some embodiments, inference and/or training logic 915 are used to perform inferencing and/or training operations using image data processed as discussed above. Details regarding inference and/or training logic 915 are provided herein in conjunction with FIGS. 9A and/or 9B.

Figure 8C:
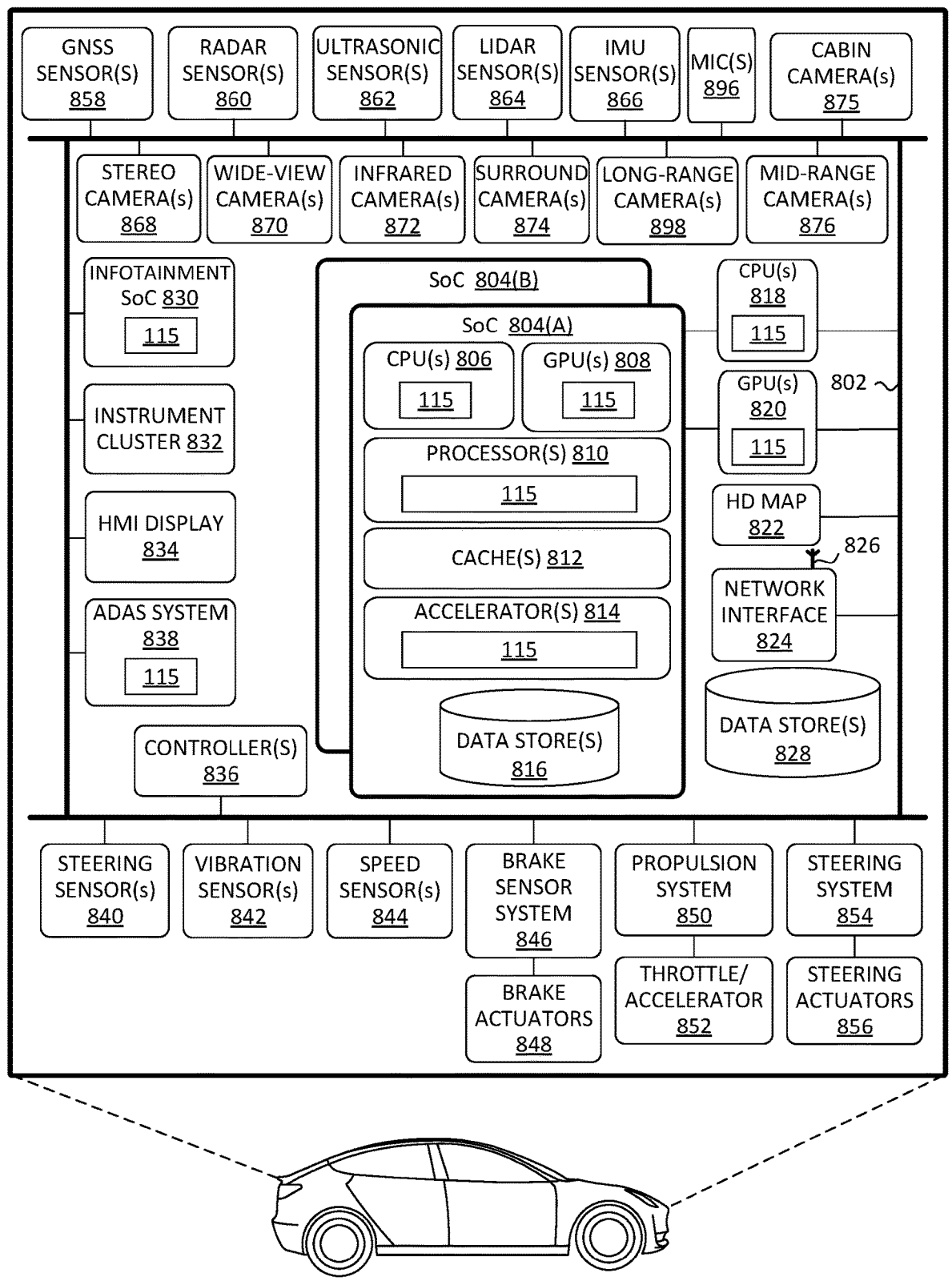
FIG. 8C is a block diagram illustrating an example system architecture for the autonomous vehicle of FIG. 8A, according to at least one embodiment.

FIG. 8C is a block diagram illustrating an example system architecture for autonomous vehicle 800 of FIG. 8A, according to at least one embodiment. In at least one embodiment, each of components, features, and systems of vehicle 800 in FIG. 8C is illustrated as being connected via a bus 802. In at least one embodiment, bus 802 may include, without limitation, a CAN data interface (alternatively referred to herein as a "CAN bus"). In at least one embodiment, a CAN may be a network inside vehicle 800 used to aid in control of various features and functionality of vehicle 800, such as actuation of brakes, acceleration, braking, steering, windshield wipers, etc. In at least one embodiment, bus 802 may be configured to have dozens or even hundreds of nodes, each with its own unique identifier (e.g., a CAN ID). In at least one embodiment, bus 802 may be read to find steering wheel angle, ground speed, engine revolutions per minute ("RPMs"), button positions, and/or other vehicle status indicators. In at least one embodiment, bus 802 may be a CAN bus that is ASIL B compliant.

In at least one embodiment, in addition to, or alternatively from CAN, FlexRay and/or Ethernet protocols may be used. In at least one embodiment, there may be any number of busses forming bus 802, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 802 may communicate with any of components of vehicle 800, and two or more busses of bus 802 may communicate with corresponding components. In at least one embodiment, each of any number of system(s) on chip(s) ("SoC(s)") 804 (such as SoC 804(A) and SoC 804(B), each of controller(s) 836, and/or each computer within vehicle may have access to same input data (e.g., inputs from sensors of vehicle 800), and may be connected to a common bus, such CAN bus.

In at least one embodiment, vehicle 800 may include one or more controller(s) 836, such as those described herein with respect to FIG. 8A. In at least one embodiment, controller(s) 836 may be used for a variety of functions. In at least one embodiment, controller(s) 836 may be coupled to any of various other components and systems of vehicle 800, and may be used for control of vehicle 800, artificial intelligence of vehicle 800, infotainment for vehicle 800, and/or other functions.

In at least one embodiment, vehicle 800 may include any number of SoCs 804. In at least one embodiment, each of SoCs 804 may include, without limitation, central processing units ("CPU(s)") 806, graphics processing units ("GPU(s)") 808, processor(s) 810, cache(s) 812, accelerator(s) 814, data store(s) 816, and/or other components and features not illustrated. In at least one embodiment, SoC(s) 804 may be used to control vehicle 800 in a variety of platforms and systems. For example, in at least one embodiment, SoC(s) 804 may be combined in a system (e.g., system of vehicle 800) with a High Definition ("HD") map 822 which may obtain map refreshes and/or updates via network interface 824 from one or more servers (not shown in FIG. 8C).

In at least one embodiment, CPU(s) 806 may include a CPU cluster or CPU complex (alternatively referred to herein as a "CCPLEX"). In at least one embodiment, CPU(s) 806 may include multiple cores and/or level two ("L2") caches. For instance, in at least one embodiment, CPU(s) 806 may include eight cores in a coherent multi-processor configuration. In at least one embodiment, CPU(s) 806 may include four dual-core clusters where each cluster has a dedicated L2 cache (e.g., a 2 megabyte (MB) L2 cache). In at least one embodiment, CPU(s) 806 (e.g., CCPLEX) may be configured to support simultaneous cluster operations enabling any combination of clusters of CPU(s) 806 to be active at any given time.

In at least one embodiment, one or more of CPU(s) 806 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 806 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 808 may include an integrated GPU (alternatively referred to herein as an "iGPU"). In at least one embodiment, GPU(s) 808 may be programmable and may be efficient for parallel workloads. In at least one embodiment, GPU(s) 808 may use an enhanced tensor instruction set. In at least one embodiment, GPU(s) 808 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 808 may include at least eight streaming microprocessors. In at least one embodiment, GPU(s) 808 may use compute application programming interface(s) (API(s)). In at least one embodiment, GPU(s) 808 may use one or more parallel computing platforms and/or programming models (e.g., NVIDIA's CUDA model).

In at least one embodiment, one or more of GPU(s) 808 may be power-optimized for best performance in automotive and embedded use cases. For example, in at least one embodiment, GPU(s) 808 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 808 may include a high bandwidth memory ("HBM") and/or a 16 GB high-bandwidth memory second generation ("HBM2") memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 808 may include unified memory technology. In at least one embodiment, address translation services ("ATS") support may be used to allow GPU(s) 808 to access CPU(s) 806 page tables directly. In at least one embodiment, embodiment, when a GPU of GPU(s) 808 memory management unit ("MMU") experiences a miss, an address translation request may be transmitted to CPU(s) 806. In response, 2 CPU of CPU(s) 806 may look in its page tables for a virtual-to-physical mapping for an address and transmit translation back to GPU(s) 808, in at least one embodiment. In at least one embodiment, unified memory technology may allow a single unified virtual address space for memory of both CPU(s) 806 and GPU(s) 808, thereby simplifying GPU(s) 808 programming and porting of applications to GPU(s) 808.

In at least one embodiment, GPU(s) 808 may include any number of access counters that may keep track of frequency of access of GPU(s) 808 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 804 may include any number of cache(s) 812, including those described herein. For example, in at least one embodiment, cache(s) 812 could include a level three ("L3") cache that is available to both CPU(s) 806 and GPU(s) 808 (e.g., that is connected to CPU(s) 806 and GPU(s) 808). In at least one embodiment, cache(s) 812 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 804 may include one or more accelerator(s) 814 (e.g., hardware accelerators, software accelerators, or a combination thereof). In at least one embodiment, SoC(s) 804 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 808 and to off-load some of tasks of GPU(s) 808 (e.g., to free up more cycles of GPU(s) 808 for performing other tasks). In at least one embodiment, accelerator(s) 814 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 814 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 808, and by using an inference accelerator, for example, a designer may target either DLA(s) or GPU(s) 808 for any function. For example, in at least one embodiment, a designer may focus processing of CNNs and floating point operations on DLA(s) and leave other functions to GPU(s) 808 and/or accelerator(s) 814.

In at least one embodiment, accelerator(s) 814 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 838, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 806. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 814 may include a computer vision network on-chip and static random-access memory ("SRAM"), for providing a high-bandwidth, low latency SRAM for accelerator(s) 814. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 804 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 814 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 800, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 866 that correlates with vehicle 800 orientation, distance, 3D location estimates of object obtained from neural network and/or other sensors (e.g., LIDAR sensor(s) 864 or RADAR sensor(s) 860), among others.

In at least one embodiment, one or more of SoC(s) 804 may include data store(s) 816 (e.g., memory). In at least one embodiment, data store(s) 816 may be on-chip memory of SoC(s) 804, which may store neural networks to be executed on GPU(s) 808 and/or a DLA. In at least one embodiment, data store(s) 816 may be large enough in capacity to store multiple instances of neural networks for redundancy and safety. In at least one embodiment, data store(s) 816 may comprise L2 or L3 cache(s).

In at least one embodiment, one or more of SoC(s) 804 may include any number of processor(s) 810 (e.g., embedded processors). In at least one embodiment, processor(s) 810 may include a boot and power management processor that may be a dedicated processor and subsystem to handle boot power and management functions and related security enforcement. In at least one embodiment, a boot and power management processor may be a part of a boot sequence of SoC(s) 804 and may provide runtime power management services. In at least one embodiment, a boot power and management processor may provide clock and voltage programming, assistance in system low power state transitions, management of SoC(s) 804 thermals and temperature sensors, and/or management of SoC(s) 804 power states. In at least one embodiment, each temperature sensor may be implemented as a ring-oscillator whose output frequency is proportional to temperature, and SoC(s) 804 may use ring-oscillators to detect temperatures of CPU(s) 806, GPU(s) 808, and/or accelerator(s) 814. In at least one embodiment, if temperatures are determined to exceed a threshold, then a boot and power management processor may enter a temperature fault routine and put SoC(s) 804 into a lower power state and/or put vehicle 800 into a chauffeur to safe stop mode (e.g., bring vehicle 800 to a safe stop).

In at least one embodiment, processor(s) 810 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 810 may further include an always on processor engine that may provide necessary hardware features to support low power sensor management and wake use cases. In at least one embodiment, an always on processor engine may include, without limitation, a processor core, a tightly coupled RAM, supporting peripherals (e.g., timers and interrupt controllers), various I/O controller peripherals, and routing logic.

In at least one embodiment, processor(s) 810 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 810 may further include a real-time camera engine that may include, without limitation, a dedicated processor subsystem for handling real-time camera management. In at least one embodiment, processor(s) 810 may further include a high-dynamic range signal processor that may include, without limitation, an image signal processor that is a hardware engine that is part of a camera processing pipeline.

In at least one embodiment, processor(s) 810 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 870, surround camera(s) 874, and/or on in-cabin monitoring camera sensor(s). In at least one embodiment, in-cabin monitoring camera sensor(s) are preferably monitored by a neural network running on another instance of SoC 804, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 808 are not required to continuously render new surfaces. In at least one embodiment, when GPU(s) 808 are powered on and active doing 3D rendering, a video image compositor may be used to offload GPU(s) 808 to improve performance and responsiveness.

In at least one embodiment, one or more SoC of SoC(s) 804 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 804 may further include an input/output controller(s) that may be controlled by software and may be used for receiving I/O signals that are uncommitted to a specific role.

In at least one embodiment, one or more of SoC(s) 804 may further include a broad range of peripheral interfaces to enable communication with peripherals, audio encoders/decoders ("codecs"), power management, and/or other devices. In at least one embodiment, SoC(s) 804 may be used to process data from cameras (e.g., connected over Gigabit Multimedia Serial Link and Ethernet channels), sensors (e.g., LIDAR sensor(s) 864, RADAR sensor(s) 860, etc. that may be connected over Ethernet channels), data from bus 802 (e.g., speed of vehicle 800, steering wheel position, etc.), data from GNSS sensor(s) 858 (e.g., connected over a Ethernet bus or a CAN bus), etc. In at least one embodiment, one or more SoC of SoC(s) 804 may further include dedicated high-performance mass storage controllers that may include their own DMA engines, and that may be used to free CPU(s) 806 from routine data management tasks.

In at least one embodiment, SoC(s) 804 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 804 may be faster, more reliable, and even more energy-efficient and space-efficient than conventional systems. For example, in at least one embodiment, accelerator(s) 814, when combined with CPU(s) 806, GPU(s) 808, and data store(s) 816, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 820) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 808.

In at least one embodiment, a CNN for facial recognition and vehicle owner identification may use data from camera sensors to identify presence of an authorized driver and/or owner of vehicle 800. In at least one embodiment, an always on sensor processing engine may be used to unlock a vehicle when an owner approaches a driver door and turns on lights, and, in a security mode, to disable such vehicle when an owner leaves such vehicle. In this way, SoC(s) 804 provide for security against theft and/or carjacking.

In at least one embodiment, a CNN for emergency vehicle detection and identification may use data from microphones 896 to detect and identify emergency vehicle sirens. In at least one embodiment, SoC(s) 804 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 858. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 862, until emergency vehicles pass.

In at least one embodiment, vehicle 800 may include CPU(s) 818 (e.g., discrete CPU(s), or dCPU(s)), that may be coupled to SoC(s) 804 via a high-speed interconnect (e.g., PCIe). In at least one embodiment, CPU(s) 818 may include an X86 processor, for example. CPU(s) 818 may be used to perform any of a variety of functions, including arbitrating potentially inconsistent results between ADAS sensors and SoC(s) 804, and/or monitoring status and health of controller(s) 836 and/or an infotainment system on a chip ("infotainment SoC") 830, for example.

In at least one embodiment, vehicle 800 may include GPU(s) 820 (e.g., discrete GPU(s), or dGPU(s)), that may be coupled to SoC(s) 804 via a high-speed interconnect (e.g., NVIDIA's NVLINK channel). In at least one embodiment, GPU(s) 820 may provide additional artificial intelligence functionality, such as by executing redundant and/or different neural networks, and may be used to train and/or update neural networks based at least in part on input (e.g., sensor data) from sensors of a vehicle 800.

In at least one embodiment, vehicle 800 may further include network interface 824 which may include, without limitation, wireless antenna(s) 826 (e.g., one or more wireless antennas for different communication protocols, such as a cellular antenna, a Bluetooth antenna, etc.). In at least one embodiment, network interface 824 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 800 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 800 information about vehicles in proximity to vehicle 800 (e.g., vehicles in front of, on a side of, and/or behind vehicle 800). In at least one embodiment, such aforementioned functionality may be part of a cooperative adaptive cruise control functionality of vehicle 800.

In at least one embodiment, network interface 824 may include an SoC that provides modulation and demodulation functionality and enables controller(s) 836 to communicate over wireless networks. In at least one embodiment, network interface 824 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 800 may further include data store(s) 828 which may include, without limitation, off-chip (e.g., off SoC(s) 804) storage. In at least one embodiment, data store(s) 828 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 800 may further include GNSS sensor(s) 858 (e.g., GPS and/or assisted GPS sensors), to assist in mapping, perception, occupancy grid generation, and/or path planning functions. In at least one embodiment, any number of GNSS sensor(s) 858 may be used, including, for example and without limitation, a GPS using a Universal Serial Bus ("USB") connector with an Ethernet-to-Serial (e.g., RS-232) bridge.

In at least one embodiment, vehicle 800 may further include RADAR sensor(s) 860. In at least one embodiment, RADAR sensor(s) 860 may be used by vehicle 800 for long-range vehicle detection, even in darkness and/or severe weather conditions. In at least one embodiment, RADAR functional safety levels may be ASIL B. In at least one embodiment, RADAR sensor(s) 860 may use a CAN bus and/or bus 802 (e.g., to transmit data generated by RADAR sensor(s) 860) for control and to access object tracking data, with access to Ethernet channels to access raw data in some examples. In at least one embodiment, a wide variety of RADAR sensor types may be used. For example, and without limitation, RADAR sensor(s) 860 may be suitable for front, rear, and side RADAR use. In at least one embodiment, one or more sensor of RADAR sensors(s) 860 is a Pulse Doppler RADAR sensor.

In at least one embodiment, RADAR sensor(s) 860 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 860 may help in distinguishing between static and moving objects, and may be used by ADAS system 838 for emergency brake assist and forward collision warning. In at least one embodiment, sensors 860($s$) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 800 surroundings at higher speeds with minimal interference from traffic in adjacent lanes. In at least one embodiment, another two antennae may expand field of view, making it possible to quickly detect vehicles entering or leaving a lane of vehicle 800.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 860 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 838 for blind spot detection and/or lane change assist.

In at least one embodiment, vehicle 800 may further include ultrasonic sensor(s) 862. In at least one embodiment, ultrasonic sensor(s) 862, which may be positioned at a front, a back, and/or side location of vehicle 800, may be used for parking assist and/or to create and update an occupancy grid. In at least one embodiment, a wide variety of ultrasonic sensor(s) 862 may be used, and different ultrasonic sensor(s) 862 may be used for different ranges of detection (e.g., 2.5 m, 4 m). In at least one embodiment, ultrasonic sensor(s) 862 may operate at functional safety levels of ASIL B.

In at least one embodiment, vehicle 800 may include LIDAR sensor(s) 864. In at least one embodiment, LIDAR sensor(s) 864 may be used for object and pedestrian detection, emergency braking, collision avoidance, and/or other functions. In at least one embodiment, LIDAR sensor(s) 864 may operate at functional safety level ASIL B. In at least one embodiment, vehicle 800 may include multiple LIDAR sensors 864 (e.g., two, four, six, etc.) that may use an Ethernet channel (e.g., to provide data to a Gigabit Ethernet switch).

In at least one embodiment, LIDAR sensor(s) 864 may be capable of providing a list of objects and their distances for a 360-degree field of view. In at least one embodiment, commercially available LIDAR sensor(s) 864 may have an advertised range of approximately 80 m, with an accuracy of 2 cm to 3 cm, and with support for a 80 Mbps Ethernet connection, for example. In at least one embodiment, one or more non-protruding LIDAR sensors may be used. In such an embodiment, LIDAR sensor(s) 864 may include a small device that may be embedded into a front, a rear, a side, and/or a corner location of vehicle 800. In at least one embodiment, LIDAR sensor(s) 864, in such an embodiment, may provide up to a 120-degree horizontal and 35-degree vertical field-of-view, with a 200 m range even for low-reflectivity objects. In at least one embodiment, front-mounted LIDAR sensor(s) 864 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 800 up to approximately 200 m. In at least one embodiment, a flash LIDAR unit includes, without limitation, a receptor, which records laser pulse transit time and reflected light on each pixel, which in turn corresponds to a range from vehicle 800 to objects. In at least one embodiment, flash LIDAR may allow for highly accurate and distortion-free images of surroundings to be generated with every laser flash. In at least one embodiment, four flash LIDAR sensors may be deployed, one at each side of vehicle 800. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 800 may further include IMU sensor(s) 866. In at least one embodiment, IMU sensor(s) 866 may be located at a center of a rear axle of vehicle 800. In at least one embodiment, IMU sensor(s) 866 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 866 may include, without limitation, accelerometers and gyroscopes. In at least one embodiment, such as in nine-axis applications, IMU sensor(s) 866 may include, without limitation, accelerometers, gyroscopes, and magnetometers.

In at least one embodiment, IMU sensor(s) 866 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 866 may enable vehicle 800 to estimate its heading without requiring input from a magnetic sensor by directly observing and correlating changes in velocity from a GPS to IMU sensor(s) 866. In at least one embodiment, IMU sensor(s) 866 and GNSS sensor(s) 858 may be combined in a single integrated unit.

In at least one embodiment, vehicle 800 may include microphone(s) 896 placed in and/or around vehicle 800. In at least one embodiment, microphone(s) 896 may be used for emergency vehicle detection and identification, among other things.

In at least one embodiment, vehicle 800 may further include any number of camera types, including stereo camera(s) 868, wide-view camera(s) 870, infrared camera(s) 872, surround camera(s) 874, long-range camera(s) 898, mid-range camera(s) 876, and/or other camera types. In at least one embodiment, cameras may be used to capture image data around an entire periphery of vehicle 800. In at least one embodiment, which types of cameras used depends on vehicle 800. In at least one embodiment, any combination of camera types may be used to provide necessary coverage around vehicle 800. In at least one embodiment, a number of cameras deployed may differ depending on embodiment. For example, in at least one embodiment, vehicle 800 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 8A and FIG. 8B.

In at least one embodiment, vehicle 800 may further include vibration sensor(s) 842. In at least one embodiment, vibration sensor(s) 842 may measure vibrations of components of vehicle 800, such as axle(s). For example, in at least one embodiment, changes in vibrations may indicate a change in road surfaces. In at least one embodiment, when two or more vibration sensors 842 are used, differences between vibrations may be used to determine friction or slippage of road surface (e.g., when a difference in vibration is between a power-driven axle and a freely rotating axle).

In at least one embodiment, vehicle 800 may include ADAS system 838. In at least one embodiment, ADAS system 838 may include, without limitation, an SoC, in some examples. In at least one embodiment, ADAS system 838 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 860, LIDAR sensor(s) 864, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 800 and automatically adjusts speed of vehicle 800 to maintain a safe distance from vehicles ahead. In at least one embodiment, a lateral ACC system performs distance keeping, and advises vehicle 800 to change lanes when necessary. In at least one embodiment, a lateral ACC is related to other ADAS applications, such as LC and CW.

In at least one embodiment, a CACC system uses information from other vehicles that may be received via network interface 824 and/or wireless antenna(s) 826 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 800), while I2V communication provides information about traffic further ahead. In at least one embodiment, a CACC system may include either or both I2V and V2V information sources. In at least one embodiment, given information of vehicles ahead of vehicle 800, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 860, coupled to a dedicated processor, digital signal processor ("DSP"), FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 860, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 800 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 800 if vehicle 800 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 800 is backing up. In at least one embodiment, an RCTW system includes an AEB system to ensure that vehicle brakes are applied to avoid a crash. In at least one embodiment, an RCTW system may use one or more rear-facing RADAR sensor(s) 860, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 800 itself decides, in case of conflicting results, whether to heed result from a primary computer or a secondary computer (e.g., a first controller or a second controller of controllers 836). For example, in at least one embodiment, ADAS system 838 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 838 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 804.

In at least one embodiment, ADAS system 838 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 838 may be fed into a primary computer's perception block and/or a primary computer's dynamic driving task block. For example, in at least one embodiment, if ADAS system 838 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 800 may further include infotainment SoC 830 (e.g., an in-vehicle infotainment system (IVI)). Although illustrated and described as an SoC, infotainment system SoC 830, in at least one embodiment, may not be an SoC, and may include, without limitation, two or more discrete components. In at least one embodiment, infotainment SoC 830 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 800. For example, infotainment SoC 830 could include radios, disk players, navigation systems, video players, USB and Bluetooth connectivity, carputers, in-car entertainment, WiFi, steering wheel audio controls, hands free voice control, a heads-up display ("HUD"), HMI display 834, a telematics device, a control panel (e.g., for controlling and/or interacting with various components, features, and/or systems), and/or other components. In at least one embodiment, infotainment SoC 830 may further be used to provide information (e.g., visual and/or audible) to user(s) of vehicle 800, such as information from ADAS system 838, autonomous driving information such as planned vehicle maneuvers, trajectories, surrounding environment information (e.g., intersection information, vehicle information, road information, etc.), and/or other information.

In at least one embodiment, infotainment SoC 830 may include any amount and type of GPU functionality. In at least one embodiment, infotainment SoC 830 may communicate over bus 802 with other devices, systems, and/or components of vehicle 800. In at least one embodiment, infotainment SoC 830 may be coupled to a supervisory MCU such that a GPU of an infotainment system may perform some self-driving functions in event that primary controller(s) 836 (e.g., primary and/or backup computers of vehicle 800) fail. In at least one embodiment, infotainment SoC 830 may put vehicle 800 into a chauffeur to safe stop mode, as described herein.

In at least one embodiment, vehicle 800 may further include instrument cluster 832 (e.g., a digital dash, an electronic instrument cluster, a digital instrument panel, etc.). In at least one embodiment, instrument cluster 832 may include, without limitation, a controller and/or supercomputer (e.g., a discrete controller or supercomputer). In at least one embodiment, instrument cluster 832 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 830 and instrument cluster 832. In at least one embodiment, instrument cluster 832 may be included as part of infotainment SoC 830, or vice versa.

In some embodiments, inference and/or training logic 915 are used to perform inferencing and/or training operations using transformed image data that may be generated as described above.

Figure 8D:
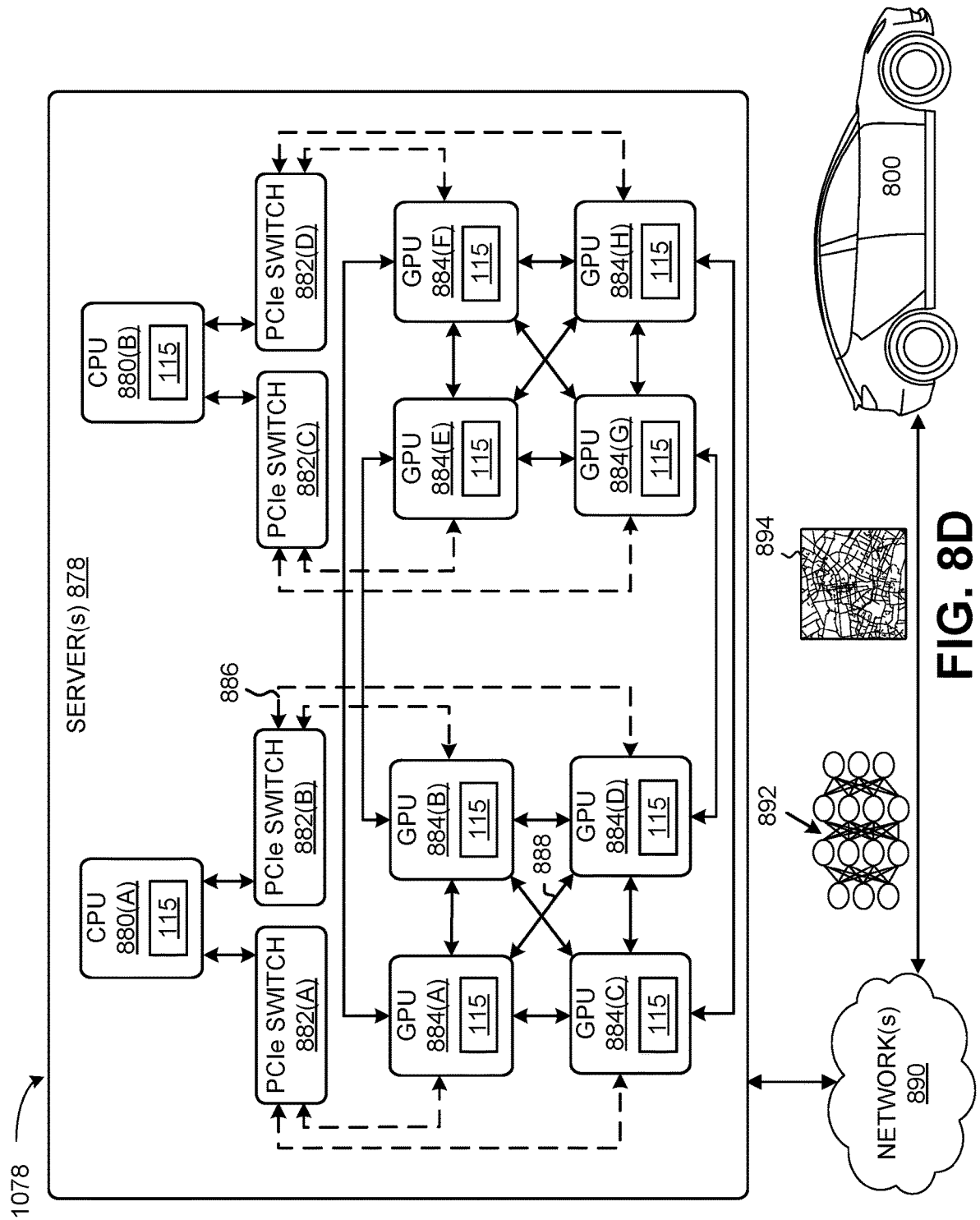
FIG. 8D is a diagram illustrating a system for communication between cloud-based server(s) and the autonomous vehicle of FIG. 8A, according to at least one embodiment.

FIG. 8D is a diagram of a system 878 for communication between cloud-based server(s) and autonomous vehicle 800 of FIG. 8A, according to at least one embodiment. In at least one embodiment, system 878 may include, without limitation, server(s) 878, network(s) 890, and any number and type of vehicles, including vehicle 800. In at least one embodiment, server(s) 878 may include, without limitation, a plurality of GPUs 884(A)-1084(H) (collectively referred to herein as GPUs 884), PCIe switches 882(A)-882(D) (collectively referred to herein as PCIe switches 882), and/or CPUs 880(A)-880(B) (collectively referred to herein as CPUs 880). In at least one embodiment, GPUs 884, CPUs 880, and PCIe switches 882 may be interconnected with high-speed interconnects such as, for example and without limitation, NVLink interfaces 888 developed by NVIDIA and/or PCIe connections 886. In at least one embodiment, GPUs 884 are connected via an NVLink and/or NVSwitch SoC and GPUs 884 and PCIe switches 882 are connected via PCIe interconnects. Although eight GPUs 884, two CPUs 880, and four PCIe switches 882 are illustrated, this is not intended to be limiting. In at least one embodiment, each of server(s) 878 may include, without limitation, any number of GPUs 884, CPUs 880, and/or PCIe switches 882, in any combination. For example, in at least one embodiment, server(s) 878 could each include eight, sixteen, thirty-two, and/or more GPUs 884.

In at least one embodiment, server(s) 878 may receive, over network(s) 890 and from vehicles, image data representative of images showing unexpected or changed road conditions, such as recently commenced road-work. In at least one embodiment, server(s) 878 may transmit, over network(s) 890 and to vehicles, neural networks 892, updated or otherwise, and/or map information 894, including, without limitation, information regarding traffic and road conditions. In at least one embodiment, updates to map information 894 may include, without limitation, updates for HD map 822, such as information regarding construction sites, potholes, detours, flooding, and/or other obstructions. In at least one embodiment, neural networks 892, and/or map information 894 may have resulted from new training and/or experiences represented in data received from any number of vehicles in an environment, and/or based at least in part on training performed at a data center (e.g., using server(s) 878 and/or other servers).

In at least one embodiment, server(s) 878 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 890), and/or machine learning models may be used by server(s) 878 to remotely monitor vehicles.

In at least one embodiment, server(s) 878 may receive data from vehicles and apply data to up-to-date real-time neural networks for real-time intelligent inferencing. In at least one embodiment, server(s) 878 may include deep-learning supercomputers and/or dedicated AI computers powered by GPU(s) 884, such as a DGX and DGX Station machines developed by NVIDIA. However, in at least one embodiment, server(s) 878 may include deep learning infrastructure that uses CPU-powered data centers.

In at least one embodiment, deep-learning infrastructure of server(s) 878 may be capable of fast, real-time inferencing, and may use that capability to evaluate and verify health of processors, software, and/or associated hardware in vehicle 800. For example, in at least one embodiment, deep-learning infrastructure may receive periodic updates from vehicle 800, such as a sequence of images and/or objects that vehicle 800 has located in that sequence of images (e.g., via computer vision and/or other machine learning object classification techniques). In at least one embodiment, deep-learning infrastructure may run its own neural network to identify objects and compare them with objects identified by vehicle 800 and, if results do not match and deep-learning infrastructure concludes that AI in vehicle 800 is malfunctioning, then server(s) 878 may transmit a signal to vehicle 800 instructing a fail-safe computer of vehicle 800 to assume control, notify passengers, and complete a safe parking maneuver.

In at least one embodiment, server(s) 878 may include GPU(s) 884 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing.

Figure 9A:
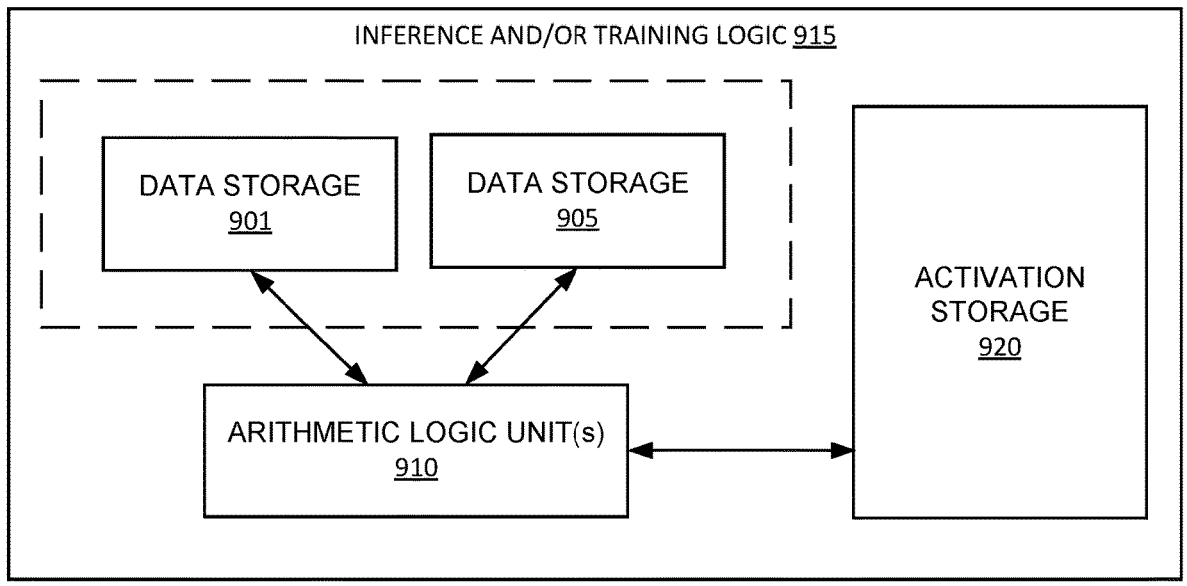
FIG. 9A illustrates inference and/or training logic, according to at least one embodiment.

FIG. 9A illustrates inference and/or training logic (hardware structures) 915 used to perform inferencing and/or training operations associated with one or more embodiments (e.g., using transformed image data as output by method 400). Details regarding inference and/or training logic 915 are provided below in conjunction with FIGS. 9A and/or 9B.

In at least one embodiment, inference and/or training logic 915 may include, without limitation, code and/or data storage 901 to store forward and/or output weight and/or input/output data, and/or other parameters to configure neurons or layers of a neural network trained and/or used for inferencing in aspects of one or more embodiments. In at least one embodiment, training logic 915 may include, or be coupled to code and/or data storage 901 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 901 may be included with other on-chip or off-chip data storage, including a processor's L1, L2, or L3 cache or system memory.

In at least one embodiment, any portion of code and/or data storage 901 may be internal or external to one or more processors or other hardware logic devices or circuits. In at least one embodiment, code and/or code and/or data storage 901 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 901 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 may include, without limitation, a code and/or data storage 905 to store backward and/or output weight and/or input/output data corresponding to neurons or layers of a neural network trained and/or used for inferencing in aspects of one or more embodiments. In at least one embodiment, code and/or data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 915 may include, or be coupled to code and/or data storage 905 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 905 may be included with other on-chip or off-chip data storage, including a processor's L1, L2, or L3 cache or system memory. In at least one embodiment, any portion of code and/or data storage 905 may be internal or external to on one or more processors or other hardware logic devices or circuits. In at least one embodiment, code and/or data storage 905 may be cache memory, DRAM, SRAM, non-volatile memory (e.g., Flash memory), or other storage. In at least one embodiment, choice of whether code and/or data storage 905 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 901 and code and/or data storage 905 may be separate storage structures. In at least one embodiment, code and/or data storage 901 and code and/or data storage 905 may be same storage structure. In at least one embodiment, code and/or data storage 901 and code and/or data storage 905 may be partially same storage structure and partially separate storage structures. In at least one embodiment, any portion of code and/or data storage 901 and code and/or data storage 905 may be included with other on-chip or off-chip data storage, including a processor's L1, L2, or L3 cache or system memory.

In at least one embodiment, inference and/or training logic 915 may include, without limitation, one or more arithmetic logic unit(s) ("ALU(s)") 910, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 920 that are functions of input/output and/or weight parameter data stored in code and/or data storage 901 and/or code and/or data storage 905. In at least one embodiment, activations stored in activation storage 920 are generated according to linear algebraic and or matrix-based mathematics performed by ALU(s) 910 in response to performing instructions or other code, wherein weight values stored in code and/or data storage 905 and/or code and/or data storage 901 are used as operands along with other values, such as bias values, gradient information, momentum values, or other parameters or hyperparameters, any or all of which may be stored in code and/or data storage 905 or code and/or data storage 901 or another storage on or off-chip.

In at least one embodiment, ALU(s) 910 are included within one or more processors or other hardware logic devices or circuits, whereas in another embodiment, ALU(s) 910 may be external to a processor or other hardware logic device or circuit that uses them (e.g., a co-processor). In at least one embodiment, ALUs 910 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 901, code and/or data storage 905, and activation storage 920 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., Flash memory), or other storage. In at least one embodiment, activation storage 920 may be completely or partially within or external to one or more processors or other logical circuits. In at least one embodiment, choice of whether activation storage 920 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 915 illustrated in FIG. 9A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9A may be used in conjunction with central processing unit ("CPU") hardware, graphics processing unit ("GPU") hardware or other hardware, such as field programmable gate arrays ("FPGAs").

Figure 9B:
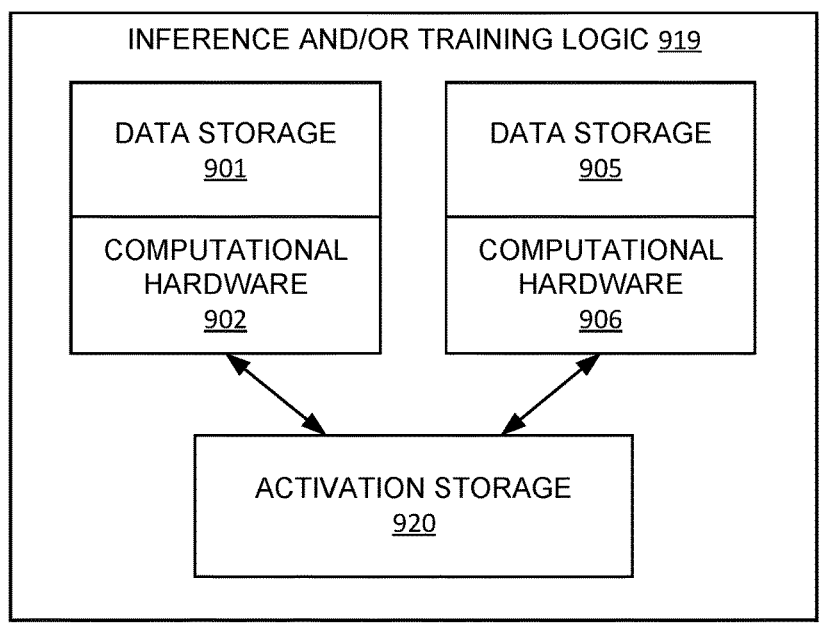
FIG. 9B illustrates inference and/or training logic, according to at least one embodiment.

FIG. 9B illustrates inference and/or training logic 915, according to at least one or more embodiments. In at least one embodiment, inference and/or training logic 915 may include, without limitation, hardware logic in which computational resources are dedicated or otherwise exclusively used in conjunction with weight values or other information corresponding to one or more layers of neurons within a neural network. In at least one embodiment, inference and/or training logic 915 illustrated in FIG. 9B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9B may be used in conjunction with central processing unit (CPU) hardware, graphics processing unit (GPU) hardware or other hardware, such as field programmable gate arrays (FPGAs). In at least one embodiment, inference and/or training logic 915 includes, without limitation, code and/or data storage 901 and code and/or data storage 905, which may be used to store code (e.g., graph code), weight values and/or other information, including bias values, gradient information, momentum values, and/or other parameter or hyperparameter information. In at least one embodiment illustrated in FIG. 9B, each of code and/or data storage 901 and code and/or data storage 905 is associated with a dedicated computational resource, such as computational hardware 902 and computational hardware 906, respectively. In at least one embodiment, each of computational hardware 902 and computational hardware 906 comprises one or more ALUs that perform mathematical functions, such as linear algebraic functions, only on information stored in code and/or data storage 901 and code and/or data storage 905, respectively, result of which is stored in activation storage 920.

In at least one embodiment, each of code and/or data storage 901 and 905 and corresponding computational hardware 902 and 906, respectively, correspond to different layers of a neural network, such that resulting activation from one "storage/computational pair 901/902" of code and/or data storage 901 and computational hardware 902 is provided as an input to "storage/computational pair 905/906" of code and/or data storage 905 and computational hardware 906, in order to mirror conceptual organization of a neural network. In at least one embodiment, each of storage/computational pairs 901/902 and 905/906 may correspond to more than one neural network layer. In at least one embodiment, additional storage/computation pairs (not shown) subsequent to or in parallel with storage computation pairs 901/902 and 905/906 may be included in inference and/or training logic 915.

Figure 10:
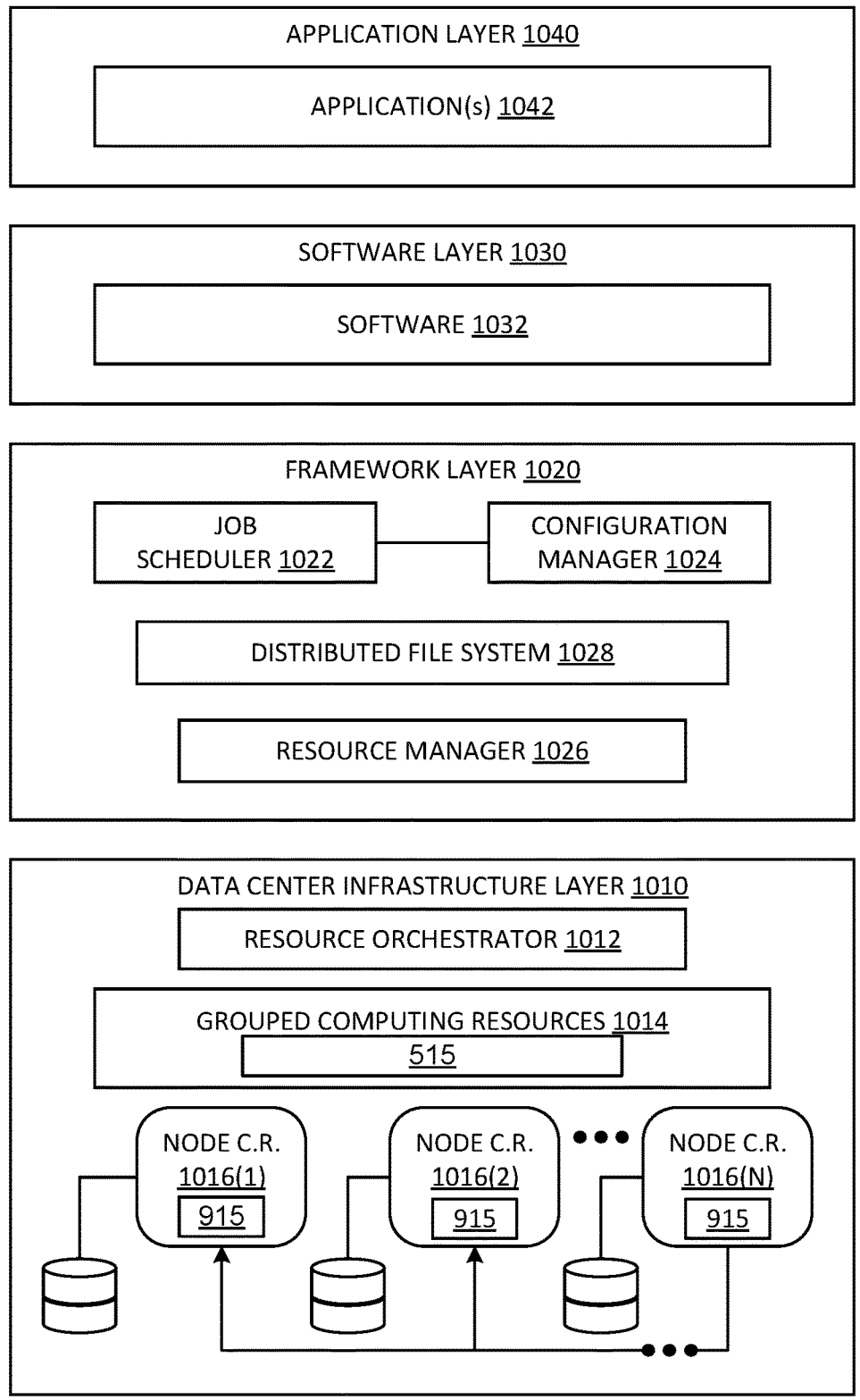
FIG. 10 illustrates an example data center system, according to at least one embodiment.

FIG. 10 illustrates an example data center 1000, in which at least one embodiment may be used. In at least one embodiment, data center 1000 includes a data center infrastructure layer 1010, a framework layer 1020, a software layer 1030, and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1012 may configure or otherwise control one or more node C.R.s 1016(1)-1016(N) and/or grouped computing resources 1014. In at least one embodiment, resource orchestrator 1012 may include a software design infrastructure ("SDI") management entity for data center 1000. In at least one embodiment, resource orchestrator may include hardware, software or some combination thereof.

In at least one embodiment, as shown in FIG. 10, framework layer 1020 includes a job scheduler 1022, a configuration manager 1024, a resource manager 1026 and a distributed file system 1028. In at least one embodiment, framework layer 1020 may include a framework to support software 1032 of software layer 1030 and/or one or more application(s) 1042 of application layer 1040. In at least one embodiment, software 1032 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1028 for large-scale data processing (e.g., "big data"). In at least one embodiment, job scheduler 1022 may include a Spark driver to facilitate scheduling of workloads supported by various layers of data center 1000. In at least one embodiment, configuration manager 1024 may be capable of configuring different layers such as software layer 1030 and framework layer 1020 including Spark and distributed file system 1028 for supporting large-scale data processing. In at least one embodiment, resource manager 1026 may be capable of managing clustered or grouped computing resources mapped to or allocated for support of distributed file system 1028 and job scheduler 1022. In at least one embodiment, clustered or grouped computing resources may include grouped computing resource 1014 at data center infrastructure layer 1010. In at least one embodiment, resource manager 1026 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1028 of framework layer 1020. The one or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1028 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1024, resource manager 1026, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

In at least one embodiment, data center 1000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1000. In at least one embodiment, trained machine learning models corresponding to one or more neural networks may be used to infer or predict information using resources described above with respect to data center 1000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

In some embodiments, inference and/or training logic 915 are used to perform inferencing and/or training operations using transformed image data generated as set forth above.

Figure 11:
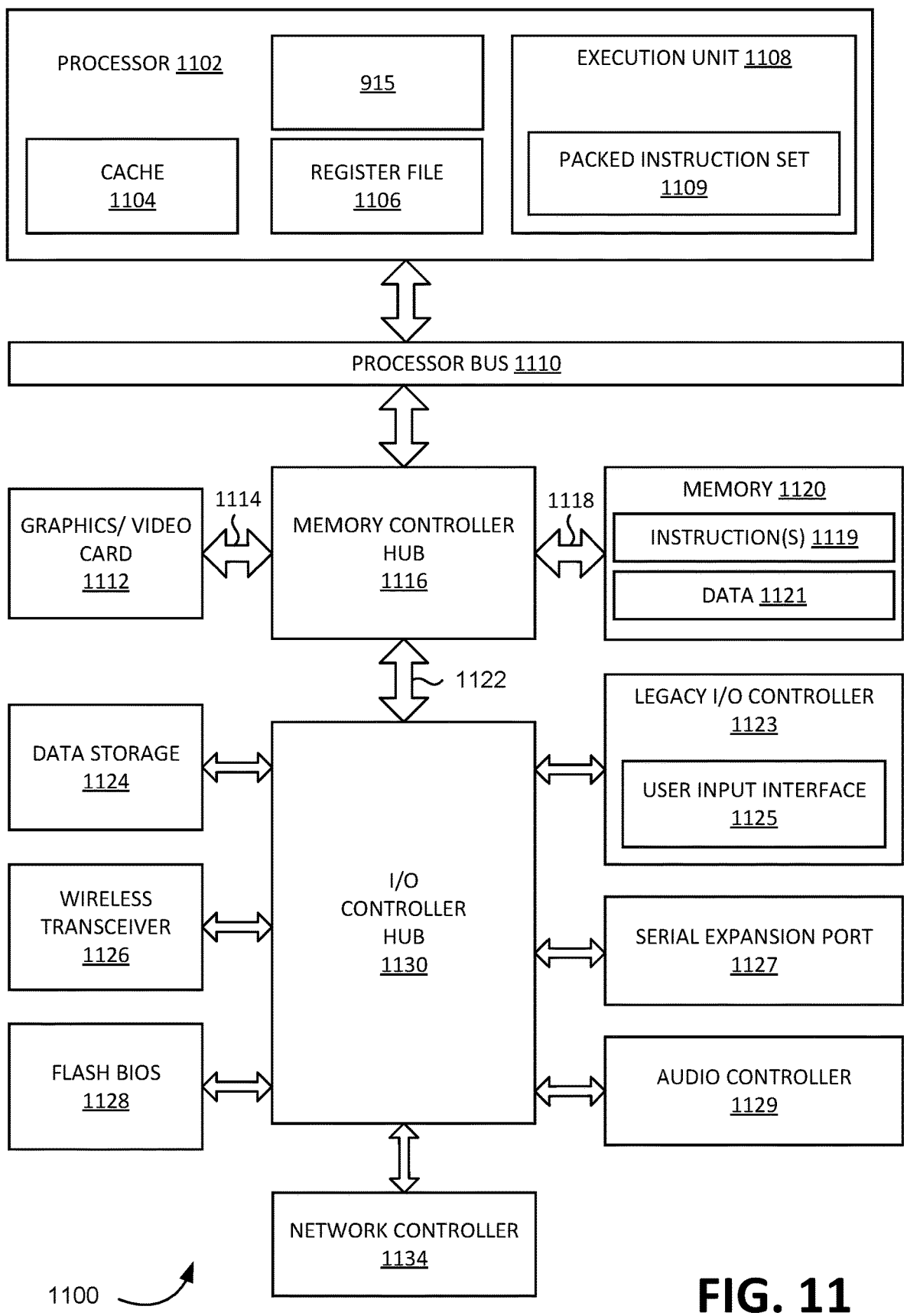
FIG. 11 illustrates a computer system, according to at least one embodiment.

FIG. 11 is a block diagram illustrating an exemplary computer system, which may be a system with interconnected devices and components, a system-on-a-chip (SOC) or some combination thereof 1100 formed with a processor that may include execution units to execute an instruction, according to at least one embodiment. In at least one embodiment, computer system 1100 may include, without limitation, a component, such as a processor 1102 to employ execution units including logic to perform algorithms for process data, in accordance with present disclosure, such as in embodiment described herein. In at least one embodiment, computer system 1100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1100 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1100 may include, without limitation, processor 1102 that may include, without limitation, one or more execution units 1108 to perform machine learning model training and/or inferencing according to techniques described herein. In at least one embodiment, computer system 1100 is a single processor desktop or server system, but in another embodiment computer system 1100 may be a multiprocessor system. In at least one embodiment, processor 1102 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. Other embodiments may also include a combination of both internal and external caches depending on particular implementation and needs. In at least one embodiment, register file 1106 may store different types of data in various registers including, without limitation, integer registers, floating point registers, status registers, and instruction pointer register.

In at least one embodiment, execution unit 1108, including, without limitation, logic to perform integer and floating point operations, also resides in processor 1102. In at least one embodiment, processor 1102 may also include a microcode ("ucode") read only memory ("ROM") that stores microcode for certain macro instructions. In at least one embodiment, execution unit 1108 may include logic to handle a packed instruction set 1109. In at least one embodiment, by including packed instruction set 1109 in an instruction set of a general-purpose processor 1102, along with associated circuitry to execute instructions, operations used by many multimedia applications may be performed using packed data in a general-purpose processor 1102. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1108 may also be used in microcontrollers, embedded processors, graphics devices, DSPs, and other types of logic circuits. In at least one embodiment, computer system 1100 may include, without limitation, a memory 1120. In at least one embodiment, memory 1120 may be implemented as a Dynamic Random Access Memory ("DRAM") device, a Static Random Access Memory ("SRAM") device, flash memory device, or other memory device. In at least one embodiment, memory 1120 may store instruction(s) 1119 and/or data 1121 represented by data signals that may be executed by processor 1102.

In at least one embodiment, system logic chip may be coupled to processor bus 1110 and memory 1120. In at least one embodiment, system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data and textures. In at least one embodiment, MCH 1116 may direct data signals between processor 1102, memory 1120, and other components in computer system 1100 and to bridge data signals between processor bus 1110, memory 1120, and a system I/O 1122. In at least one embodiment, system logic chip may provide a graphics port for coupling to a graphics controller. In at least one embodiment, MCH 1116 may be coupled to memory 1120 through a high bandwidth memory path 1118 and graphics/video card 1112 may be coupled to MCH 1116 through an Accelerated Graphics Port ("AGP") interconnect 1114.

In at least one embodiment, computer system 1100 may use system I/O 1122 that is a proprietary hub interface bus to couple MCH 1116 to I/O controller hub ("ICH") 1130. In at least one embodiment, ICH 1130 may provide direct connections to some I/O devices via a local I/O bus. In at least one embodiment, local I/O bus may include, without limitation, a high-speed I/O bus for connecting peripherals to memory 1120, chipset, and processor 1102. Examples may include, without limitation, an audio controller 1129, a firmware hub ("flash BIOS") 1128, a wireless transceiver 1126, a data storage 1124, a legacy I/O controller 1123 containing user input and keyboard interfaces 1125, a serial expansion port 1127, such as Universal Serial Bus ("USB"), and a network controller 1134. Data storage 1124 may comprise a hard disk drive, a floppy disk drive, a CD-ROM device, a flash memory device, or other mass storage device.

In at least one embodiment, FIG. 11 illustrates a system, which includes interconnected hardware devices or "chips," whereas in other embodiments, FIG. 11 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1100 are interconnected using compute express link (CXL) interconnects.

In some embodiments, inference and/or training logic 915 are used to perform inferencing and/or training operations using transformed image data that has been generated as described above. Details regarding inference and/or training logic 915 are provided below in conjunction with FIGS. 9A and/or 9B. In at least one embodiment, inference and/or training logic 915 may be used in system FIG. 11 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 12:
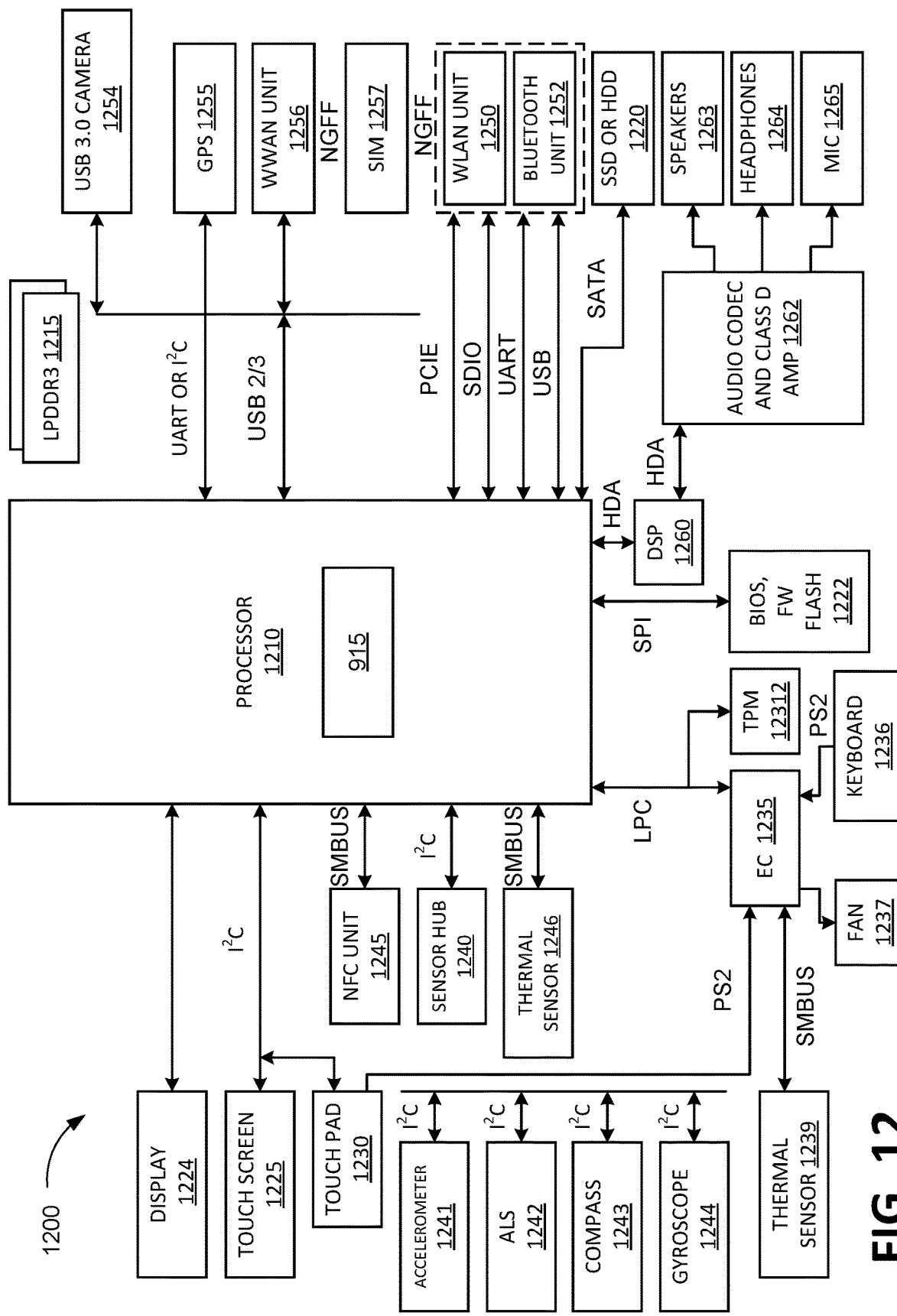
FIG. 12 illustrates a computer system, according to at least one embodiment.

FIG. 12 is a block diagram illustrating an electronic device 1200 for utilizing a processor 1210, according to at least one embodiment. In at least one embodiment, electronic device 1200 may be, for example and without limitation, a notebook, a tower server, a rack server, a blade server, a laptop, a desktop, a tablet, a mobile device, a phone, an embedded computer, or any other suitable electronic device.

In at least one embodiment, system 1200 may include, without limitation, processor 1210 communicatively coupled to any suitable number or kind of components, peripherals, modules, or devices. In at least one embodiment, processor 1210 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 12 illustrates a system, which includes interconnected hardware devices or "chips," whereas in other embodiments, FIG. 12 may illustrate an exemplary System on a Chip ("SoC"). In at least one embodiment, devices illustrated in FIG. 12 may be interconnected with proprietary interconnects, standardized interconnects (e.g., PCIe) or some combination thereof. In at least one embodiment, one or more components of FIG. 12 are interconnected using compute express link (CXL) interconnects.

In at least one embodiment, FIG. 12 may include a display 1224, a touch screen 1225, a touch pad 1230, a Near Field Communications unit ("NFC") 1245, a sensor hub 1240, a thermal sensor 1246, an Express Chipset ("EC") 1235, a Trusted Platform Module ("TPM") 1238, BIOS/firmware/flash memory ("BIOS, FW Flash") 1222, a DSP 1260, a drive 1220 such as a Solid State Disk ("SSD") or a Hard Disk Drive ("HDD"), a wireless local area network unit ("WLAN") 1250, a Bluetooth unit 1252, a Wireless Wide Area Network unit ("WWAN") 1256, a Global Positioning System (GPS) 1255, a camera ("USB 3.0 camera") 1254 such as a USB 3.0 camera, and/or a Low Power Double Data Rate ("LPDDR") memory unit ("LPDDR3") 1215 implemented in, for example, LPDDR3 standard. These components may each be implemented in any suitable manner.

In at least one embodiment, other components may be communicatively coupled to processor 1210 through components discussed above. In at least one embodiment, an accelerometer 1241, Ambient Light Sensor ("ALS") 1242, compass 1243, and a gyroscope 1244 may be communicatively coupled to sensor hub 1240. In at least one embodiment, thermal sensor 1239, a fan 1237, a keyboard 1246, and a touch pad 1230 may be communicatively coupled to EC 1235. In at least one embodiment, speaker 1263, headphones 1264, and microphone ("mic") 1265 may be communicatively coupled to an audio unit ("audio codec and class d amp") 1262, which may in turn be communicatively coupled to DSP 1260. In at least one embodiment, audio unit 1264 may include, for example and without limitation, an audio coder/decoder ("codec") and a class D amplifier. In at least one embodiment, SIM card ("SIM") 1257 may be communicatively coupled to WWAN unit 1256. In at least one embodiment, components such as WLAN unit 1250 and Bluetooth unit 1252, as well as WWAN unit 1256 may be implemented in a Next Generation Form Factor ("NGFF").

Inference and/or training logic 915 are used to perform inferencing and/or training operations associated with one or more embodiments. Details regarding inference and/or training logic 915 are provided below in conjunction with FIGS. 9A and/or 9B. In at least one embodiment, inference and/or training logic 915 may be used in system FIG. 12 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 13:
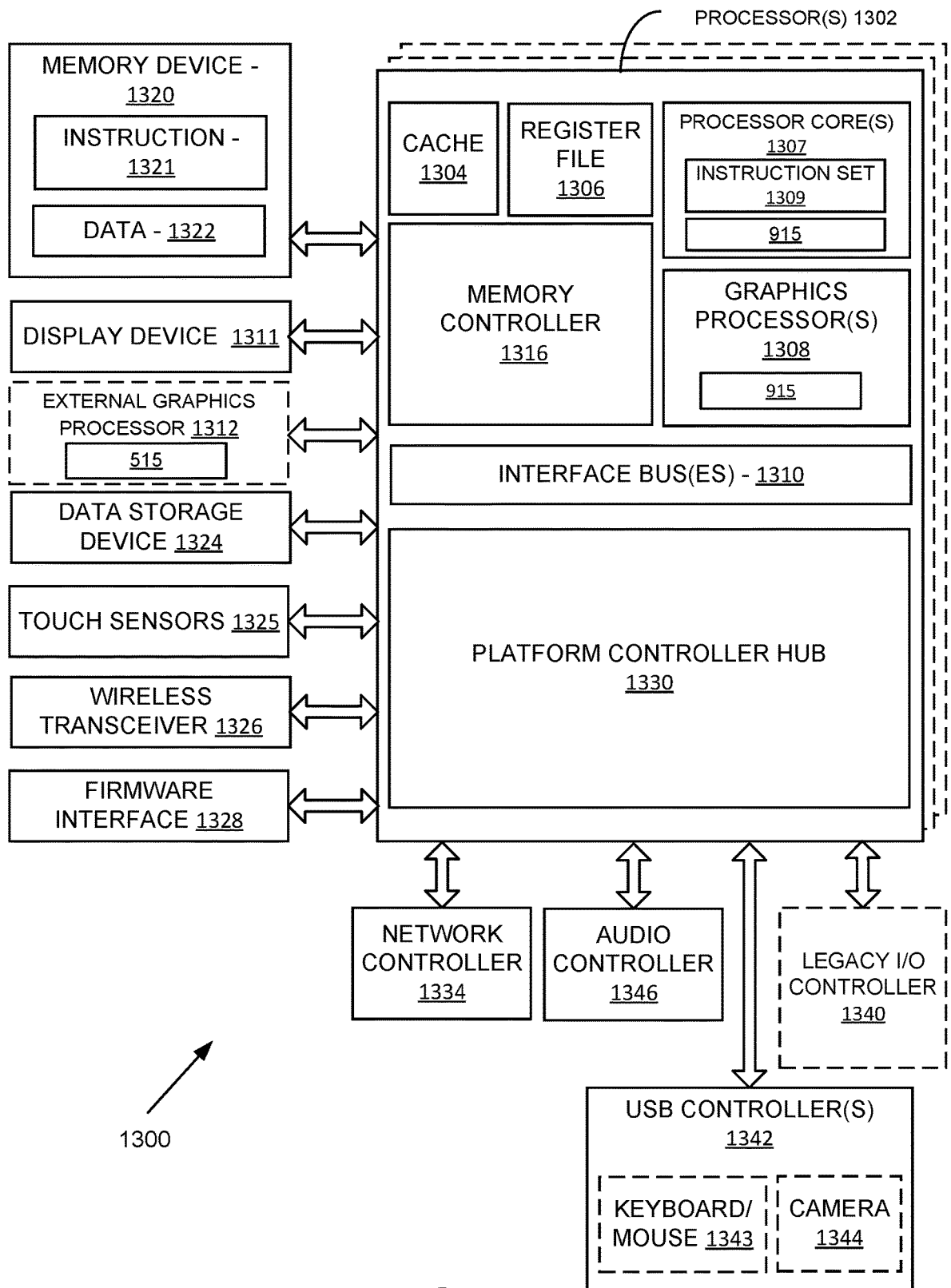
FIG. 13 illustrates at least portions of a graphics processor, according to one or more embodiments.

FIG. 13 is a block diagram of a processing system, according to at least one embodiment. In at least one embodiment, system 1300 includes one or more processors 1302 and one or more graphics processors 1308, and may be a single processor desktop system, a multiprocessor workstation system, or a server system having a large number of processors 1302 or processor cores 1307. In at least one embodiment, system 1300 is a processing platform incorporated within a system-on-a-chip (SoC) integrated circuit for use in mobile, handheld, or embedded devices.

In at least one embodiment, system 1300 can include, or be incorporated within a server-based gaming platform, a game console, including a game and media console, a mobile gaming console, a handheld game console, or an online game console. In at least one embodiment, system 1300 is a mobile phone, smart phone, tablet computing device or mobile Internet device. In at least one embodiment, processing system 1300 can also include, couple with, or be integrated within a wearable device, such as a smart watch wearable device, smart eyewear device, augmented reality device, or virtual reality device. In at least one embodiment, processing system 1300 is a television or set top box device having one or more processors 1302 and a graphical interface generated by one or more graphics processors 1308.

In at least one embodiment, one or more processors 1302 each include one or more processor cores 1307 to process instructions which, when executed, perform operations for system and user software. In at least one embodiment, each of one or more processor cores 1307 is configured to process a specific instruction set 1309. In at least one embodiment, instruction set 1309 may facilitate Complex Instruction Set Computing (CISC), Reduced Instruction Set Computing (RISC), or computing via a Very Long Instruction Word (VLIW). In at least one embodiment, processor cores 1307 may each process a different instruction set 1309, which may include instructions to facilitate emulation of other instruction sets. In at least one embodiment, processor core 1307 may also include other processing devices, such a Digital Signal Processor (DSP).

In at least one embodiment, processor 1302 includes cache memory 1304. In at least one embodiment, processor 1302 can have a single internal cache or multiple levels of internal cache. In at least one embodiment, cache memory is shared among various components of processor 1302. In at least one embodiment, processor 1302 also uses an external cache (e.g., a Level-3 (L3) cache or Last Level Cache (LLC)) (not shown), which may be shared among processor cores 1307 using known cache coherency techniques. In at least one embodiment, register file 1306 is additionally included in processor 1302 which may include different types of registers for storing different types of data (e.g., integer registers, floating point registers, status registers, and an instruction pointer register). In at least one embodiment, register file 1306 may include general-purpose registers or other registers.

In at least one embodiment, one or more processor(s) 1302 are coupled with one or more interface bus(es) 1310 to transmit communication signals such as address, data, or control signals between processor 1302 and other components in system 1300. In at least one embodiment, interface bus 1310, in one embodiment, can be a processor bus, such as a version of a Direct Media Interface (DMI) bus. In at least one embodiment, interface 1310 is not limited to a DMI bus, and may include one or more Peripheral Component Interconnect buses (e.g., PCI, PCI Express), memory busses, or other types of interface busses. In at least one embodiment processor(s) 1302 include an integrated memory controller 1316 and a platform controller hub 1330. In at least one embodiment, memory controller 1316 facilitates communication between a memory device and other components of system 1300, while platform controller hub (PCH) 1330 provides connections to I/O devices via a local I/O bus.

In at least one embodiment, memory device 1320 can be a dynamic random access memory (DRAM) device, a static random access memory (SRAM) device, flash memory device, phase-change memory device, or some other memory device having suitable performance to serve as process memory. In at least one embodiment memory device 1320 can operate as system memory for system 1300, to store data 1322 and instructions 1321 for use when one or more processors 1302 executes an application or process. In at least one embodiment, memory controller 1316 also couples with an optional external graphics processor 1312, which may communicate with one or more graphics processors 1308 in processors 1302 to perform graphics and media operations. In at least one embodiment, a display device 1311 can connect to processor(s) 1302. In at least one embodiment display device 1311 can include one or more of an internal display device, as in a mobile electronic device or a laptop device or an external display device attached via a display interface (e.g., DisplayPort, etc.). In at least one embodiment, display device 1311 can include a head mounted display (HMD) such as a stereoscopic display device for use in virtual reality (VR) applications or augmented reality (AR) applications.

In at least one embodiment, platform controller hub 1330 enables peripherals to connect to memory device 1320 and processor 1302 via a high-speed I/O bus. In at least one embodiment, I/O peripherals include, but are not limited to, an audio controller 1346, a network controller 1334, a firmware interface 1328, a wireless transceiver 1326, touch sensors 1325, a data storage device 1324 (e.g., hard disk drive, flash memory, etc.). In at least one embodiment, data storage device 1324 can connect via a storage interface (e.g., SATA) or via a peripheral bus, such as a Peripheral Component Interconnect bus (e.g., PCI, PCI Express). In at least one embodiment, touch sensors 1325 can include touch screen sensors, pressure sensors, or fingerprint sensors. In at least one embodiment, wireless transceiver 1326 can be a Wi-Fi transceiver, a Bluetooth transceiver, or a mobile network transceiver such as a 3G, 4G, or Long Term Evolution (LTE) transceiver. In at least one embodiment, firmware interface 1328 enables communication with system firmware, and can be, for example, a unified extensible firmware interface (UEFI). In at least one embodiment, network controller 1334 can enable a network connection to a wired network. In at least one embodiment, a high-performance network controller (not shown) couples with interface bus 1310. In at least one embodiment, audio controller 1346 is a multi-channel high definition audio controller. In at least one embodiment, system 1300 includes an optional legacy I/O controller 1340 for coupling legacy (e.g., Personal System 2 (PS/2)) devices to system. In at least one embodiment, platform controller hub 1330 can also connect to one or more Universal Serial Bus (USB) controllers 1342 connect input devices, such as keyboard and mouse 1343 combinations, a camera 1344, or other USB input devices.

In at least one embodiment, an instance of memory controller 1316 and platform controller hub 1330 may be integrated into a discreet external graphics processor, such as external graphics processor 1312. In at least one embodiment, platform controller hub 1330 and/or memory controller 1316 may be external to one or more processor(s) 1302. For example, in at least one embodiment, system 1300 can include an external memory controller 1316 and platform controller hub 1330, which may be configured as a memory controller hub and peripheral controller hub within a system chipset that is in communication with processor(s) 1302.

Inference and/or training logic 915 are used to perform inferencing and/or training operations associated with one or more embodiments. Details regarding inference and/or training logic 515 are provided below in conjunction with FIGS.

9A and/or 9B. In at least one embodiment portions or all of inference and/or training logic 915 may be incorporated into graphics processor 1312. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 9A or 9B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate synthetic data imitating failure cases in a network training process, which can help to improve performance of the network while limiting the amount of synthetic data to avoid overfitting.

Figure 14:
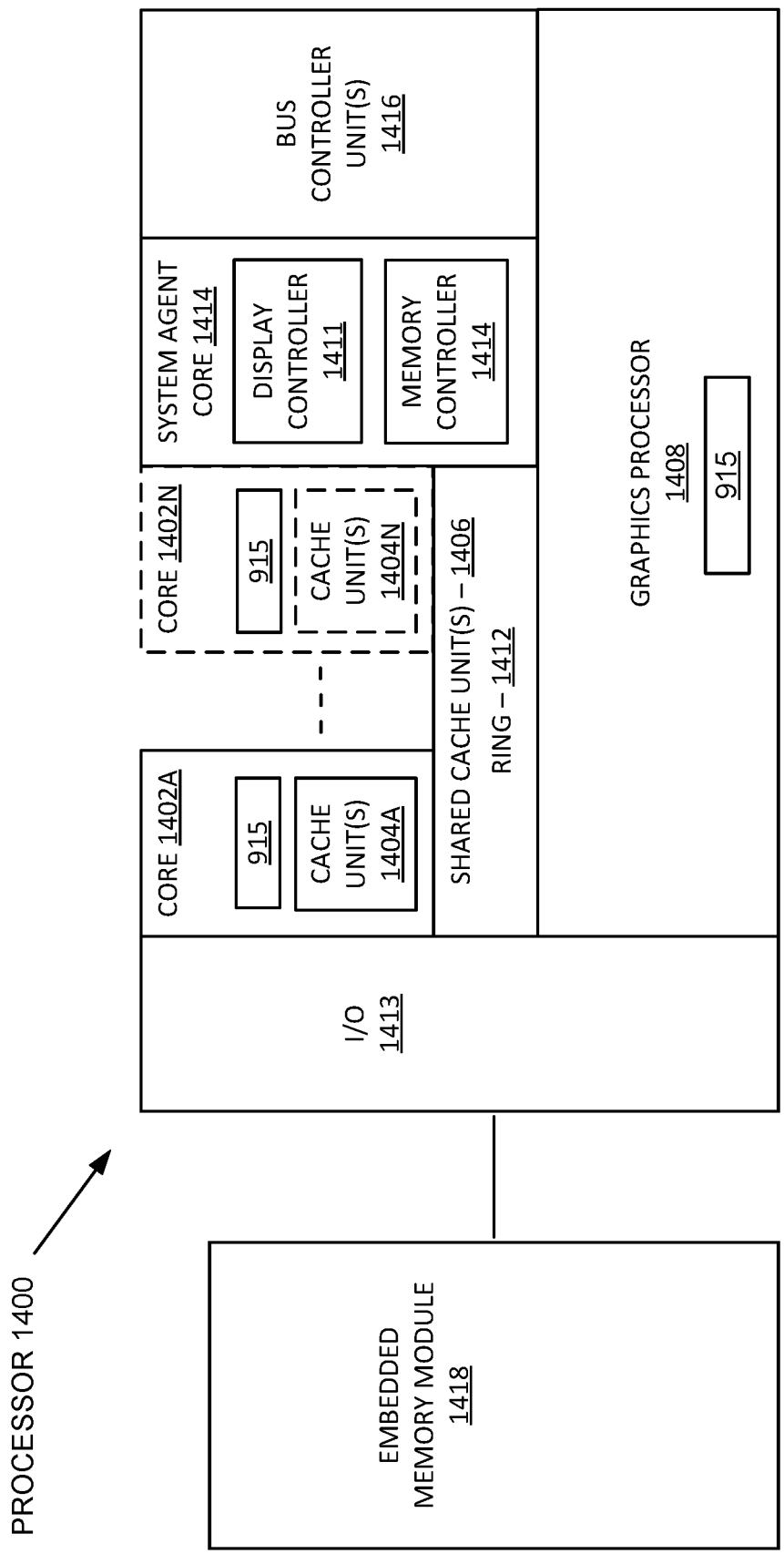
FIG. 14 illustrates at least portions of a graphics processor, according to one or more embodiments.

FIG. 14 is a block diagram of a processor 1400 having one or more processor cores 1402A-1202N, an integrated memory controller 1414, and an integrated graphics processor 1408, according to at least one embodiment. In at least one embodiment, processor 1400 can include additional cores up to and including additional core 1402N represented by dashed lined boxes. In at least one embodiment, each of processor cores 1402A-1002N includes one or more internal cache units 1404A-1404N. In at least one embodiment, each processor core also has access to one or more shared cached units 1406.

In at least one embodiment, internal cache units 1404A-1404N and shared cache units 1406 represent a cache memory hierarchy within processor 1400. In at least one embodiment, cache memory units 1404A-1404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1406 and 1404A-1404N.

In at least one embodiment, processor 1400 may also include a set of one or more bus controller units 1416 and a system agent core 1410. In at least one embodiment, one or more bus controller units 1416 manage a set of peripheral buses, such as one or more PCI or PCI express busses. In at least one embodiment, system agent core 1410 provides management functionality for various processor components. In at least one embodiment, system agent core 1410 includes one or more integrated memory controllers 1414 to manage access to various external memory devices (not shown).

In at least one embodiment, one or more of processor cores 1402A-1402N include support for simultaneous multi-threading. In at least one embodiment, system agent core 1410 includes components for coordinating and operating cores 1402A-1402N during multi-threaded processing. In at least one embodiment, system agent core 1410 may additionally include a power control unit (PCU), which includes logic and components to regulate one or more power states of processor cores 1402A-1402N and graphics processor 1408.

In at least one embodiment, processor 1400 additionally includes graphics processor 1408 to execute graphics processing operations. In at least one embodiment, graphics processor 1408 couples with shared cache units 1406, and system agent core 1410, including one or more integrated memory controllers 1414. In at least one embodiment, system agent core 1410 also includes a display controller 1411 to drive graphics processor output to one or more coupled displays. In at least one embodiment, display controller 1411 may also be a separate module coupled with graphics processor 1408 via at least one interconnect, or may be integrated within graphics processor 1408.

In at least one embodiment, a ring based interconnect unit 1412 is used to couple internal components of processor 1400. In at least one embodiment, an alternative interconnect unit may be used, such as a point-to-point interconnect, a switched interconnect, or other techniques. In at least one embodiment, graphics processor 1408 couples with ring interconnect 1412 via an I/O link 1413.

In at least one embodiment, I/O link 1413 represents at least one of multiple varieties of I/O interconnects, including an on package I/O interconnect which facilitates communication between various processor components and a high-performance embedded memory module 1418, such as an eDRAM module. In at least one embodiment, each of processor cores 1402A-1402N and graphics processor 1408 use embedded memory modules 1418 as a shared Last Level Cache.

In at least one embodiment, processor cores 1402A-1402N are homogenous cores executing a common instruction set architecture. In at least one embodiment, processor cores 1402A-1402N are heterogeneous in terms of instruction set architecture (ISA), where one or more of processor cores 1402A-1402N execute a common instruction set, while one or more other cores of processor cores 1402A-1402N executes a subset of a common instruction set or a different instruction set. In at least one embodiment, processor cores 1402A-1402N are heterogeneous in terms of microarchitecture, where one or more cores having a relatively higher power consumption couple with one or more power cores having a lower power consumption. In at least one embodiment, processor 1400 can be implemented on one or more chips or as a SoC integrated circuit.

In some embodiments, inference and/or training logic 915 are used to perform inferencing and/or training operations using transformed image data (e.g., that has been generated by an RGB-IR camera and then processed based on lighting conditions). Details regarding inference and/or training logic 915 are provided below in conjunction with FIGS. 9A and/or 9B. In at least one embodiment portions or all of inference and/or training logic 915 may be incorporated into processor 1400. For example, in at least one embodiment, training and/or inferencing techniques described herein may use one or more of ALUs embodied in graphics processor 112, graphics core(s) 1402A-1402N, or other components in FIG. 14. Moreover, in at least one embodiment, inferencing and/or training operations described herein may be done using logic other than logic illustrated in FIG. 9A or 9B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate synthetic data imitating failure cases in a network training process, which can help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU, GPU, DPU, or hardware accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A processor comprising:
   one or more processing units to:
   receive image data comprising infrared values and visible light values;

compute a scene detection value for the image data based on a comparison between the infrared values and the visible light values;

determine one or more quantities comprising an infrared subtraction factor based on the scene detection value, the one or more quantities controlling an amount of infrared correction to apply to the image data, and the infrared subtraction factor having a monotonically decreasing relationship with the scene detection value and causing an amount attributable to infrared to be subtracted from the visible light values; and transform the image data based on the one or more quantities.

2. The processor of claim 1, wherein the image data comprises raw image data of an image sensor that comprises pixel sensors for Red, Blue, Green, and Infrared (RGB-IR), and wherein the infrared values comprise an infrared pixel value and the visible light values comprise a red pixel value, a blue pixel value, and a green pixel value.

3. The processor of claim 1, wherein the scene detection value is based on a relationship between the infrared values and the visible light values present in the image data and controls an amount of infrared correction to apply to the image data, wherein the amount of the infrared correction has an inverse relationship to the scene detection value.

4. The processor of claim 1, wherein the scene detection value comprises a ratio between an intensity of the infrared values and an intensity of the visible light values.

5. The processor of claim 4, wherein the intensity of the visible light values is determined based at least in part on an intensity of green pixel values.

6. The processor of claim 1, wherein the one or more processing units compute the scene detection value by:

computing a first value representing an intensity of the infrared values, wherein the first value comprises an average of a plurality of infrared pixel values in the image data;

computing a second value representing an intensity of the visible light values, wherein the second value comprises an average of a plurality of green pixel values in the image data; and generating the scene detection value based on the first value and the second value.

7. The processor of claim 1, wherein the one or more processing units determine the one or more quantities by calculating, based on the scene detection value, at least one of: a quantity for infrared subtraction, a quantity for white balance, a quantity for color modification, or a quantity for saturation.

8. The processor of claim 1, wherein the one or more processing units determine the one or more quantities by using the scene detection value as an index to select the one or more quantities from a set of quantities.

9. The processor of claim 1, wherein the one or more processing units determine the one or more quantities based on the scene detection value by:

determining, responsive to computing a first scene detection value based on a first ratio of the infrared values to the visible light values, a first infrared subtraction factor that causes a first amount attributable to infrared to be subtracted from the visible light values; and determining, responsive to computing a second scene detection value based on a second ratio of the infrared values to the visible light values that is higher than the first ratio of the infrared values to the visible light values, a second infrared subtraction factor that causes a second amount attributable to infrared to be subtracted from the visible light values, wherein the second amount is less than the first amount.

10. The processor of claim 9, wherein the one or more quantities further comprise at least one of a color correction factor, a color saturation factor, or a white balance factor, and wherein the one or more processing units determine the one or more quantities based on the scene detection value by:

determining, responsive to computing the first scene detection value, at least one of a first color correction factor, a first color saturation factor, or a first white balance factor that accounts for a first remainder of the visible light values that is attributable to infrared; and determining, responsive to computing the second scene detection value, at least one of a second color correction factor, a second color saturation factor, or a second white balance factor that accounts for a second remainder of the visible light values that is attributable to infrared.

11. The processor of claim 1, wherein the one or more processing units determine the one or more quantities based on the scene detection value by performing a lookup using a lookup table that relates scene detection values to infrared subtraction factors.

12. The processor of claim 1, wherein the one or more processing units transform the image data from a first color model to a second color model, wherein the first color model comprises a red component, a green component, and a blue component and the second color model comprises a luminance component and a chrominance component.

13. The processor of claim 1, wherein the one or more processing units is further to:

process the transformed image data using a machine learning model trained to output at least one of a prediction, an estimation or a classification based on input image data, wherein the output generated based on an input of the transformed image data is higher than an accuracy of an output generated based on an input of the image data.

14. A system, comprising:

one or more image sensors configured to generate image data comprising infrared values and visible light values; and one or more processing units to:

receive the image data;

compute a scene detection value for the image data based on a comparison between the infrared values and the visible light values;

determine one or more quantities comprising an infrared subtraction factor based on the scene detection value, the one or more quantities controlling an amount of infrared correction to apply to the image data, and the infrared subtraction factor having a monotonically decreasing relationship with the scene detection value and causing an amount attributable to infrared to be subtracted from the visible light values; and transform the image data based on the one or more quantities into transformed image data.

15. The system of claim 14, further comprising:

a display device to display the transformed image data.

16. The system of claim 15, wherein the one or more image sensors are configured to generate the image data of an interior of a vehicle, and wherein the display device is disposed in an instrument panel of the vehicle.

17. The system of claim 14, wherein the scene detection value is based on a relationship between the infrared values and the visible light values present in the image data and controls an amount of infrared correction to apply to the image data, wherein the amount of the infrared correction has an inverse relationship to the scene detection value.

18. The system of claim 14, wherein the scene detection value comprises a ratio between an intensity of the infrared values and an intensity of the visible light values.

19. The system of claim 14, wherein the one or more processing units determine the one or more quantities based on the scene detection value by:
   determining, responsive to computing a first scene detection value based on a first ratio of the infrared values to the visible light values, a first infrared subtraction factor that causes a first amount attributable to infrared to be subtracted from the visible light values; and
   determining, responsive to computing a second scene detection value based on a second ratio of the infrared values to the visible light values that is higher than the first ratio of the infrared values to the visible light values, a second infrared subtraction factor that causes a second amount attributable to infrared to be subtracted from the visible light values, wherein the second amount is less than the first amount.

20. The system of claim 14, wherein the system comprises at least one of:
   a control system for an autonomous or semi-autonomous machine;
   a perception system for an autonomous or semi-autonomous machine;
   a driver monitoring system for an autonomous or semi-autonomous machine;
   an occupant monitoring system for an autonomous or semi-autonomous machine;
   a system for performing simulation operations;
   a system for performing digital twin operations;
   a system for performing deep learning operations;
   a system implemented using an edge device;
   a system implemented using a robot;
   a system incorporating one or more virtual machines (VMs);
   a system implemented at least partially in a data center;
   a system including a collaborative creation platform for three-dimensional (3D) content; or
   a system implemented at least partially using cloud computing resources.

21. A method comprising:
   receiving image data comprising infrared values and visible light values;
   computing a scene detection value for the image data based on a comparison between the infrared values and the visible light values;
   determining one or more quantities comprising an infrared subtraction factor based on the scene detection value, the one or more quantities controlling an amount of infrared correction to apply to the image data, and the infrared subtraction factor having a monotonically decreasing relationship with the scene detection value and causing an amount attributable to infrared to be subtracted from the visible light values; and
   transforming the image data based on the one or more quantities into transformed image data.

\* \* \* \* \*